United States Patent
Lee et al.

(10) Patent No.: US 8,687,159 B2
(45) Date of Patent: Apr. 1, 2014

(54) LIQUID CRYSTAL DISPLAY DEVICE OF IN-PLANE SWITCHING MODE AND METHOD FOR MANUFACTURING THE SAME

(75) Inventors: Won Ho Lee, Gyeonggi-do (KR); Sang Hun Han, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 321 days.

(21) Appl. No.: 12/219,297

(22) Filed: Jul. 18, 2008

(65) Prior Publication Data

US 2009/0021683 A1  Jan. 22, 2009

(30) Foreign Application Priority Data

Jul. 20, 2007 (KR) .......................... 10-2007-0072960
Apr. 3, 2008 (KR) .......................... 10-2008-0031141
Jul. 15, 2008 (KR) .......................... 10-2008-0068741

(51) Int. Cl.
  *G02F 1/1343* (2006.01)
(52) U.S. Cl.
  USPC .......................................... 349/141
(58) Field of Classification Search
  USPC .......................................... 349/141, 139, 145
  See application file for complete search history.

(56) References Cited

U.S. PATENT DOCUMENTS

| | | | |
|---|---|---|---|
| 5,905,556 A | 5/1999 | Suzuki et al. | 349/141 |
| 6,078,375 A * | 6/2000 | Matsumoto et al. | 349/123 |
| 2002/0030782 A1 | 3/2002 | Lee | |
| 2004/0095543 A1 | 5/2004 | Ko et al. | 349/141 |
| 2004/0125304 A1 | 7/2004 | Lee et al. | 349/141 |
| 2007/0153201 A1 | 7/2007 | Lee et al. | |
| 2007/0252937 A1 * | 11/2007 | Suzuki et al. | 349/141 |

FOREIGN PATENT DOCUMENTS

TW  I228627  9/2003
TW  I251691  10/2003

* cited by examiner

*Primary Examiner* — Mark Robinson
*Assistant Examiner* — Robert Tavlykaev
(74) *Attorney, Agent, or Firm* — Morgan, Lewis & Bockius LLP

(57) ABSTRACT

A liquid crystal display device of an in-plane switching mode and a method for manufacturing the same are disclosed. The liquid crystal display device of an in-plane switching mode includes gate lines and data lines which cross each other on a substrate to define pixel regions, thin film transistors which are formed at crossing portions of the gate lines and the data lines, first common lines formed on the same layer as the gate lines, first electrode fingers which have a plurality of diverged first fingers and include L-shaped protruded patterns at one ends of the first fingers in the pixel regions, and second electrode fingers which have second fingers formed alternately with the first fingers and include I-shaped patterns at one ends of the second fingers in the pixel regions, wherein the L-shaped protruded patterns and the I-shaped patterns overlap partly with the first common lines.

9 Claims, 28 Drawing Sheets

LIQUID CRYSTAL DISPLAY DEVICE OF IN-PLANE SWITCHING MODE AND METHOD FOR MANUFACTURING THE SAME

CROSS-REFERENCE TO RELATED APPLICATION

This application claims the benefit of Korean Patent Application No. 2007-072960, filed on Jul. 20, 2007, Korean Patent Application No. 2008-031141, filed on Apr. 3, 2008 and Korean Patent Application No. 2008-068741, filed on Jul. 15, 2008 which are hereby incorporated by reference in their entirety as if fully set forth herein.

BACKGROUND OF THE INVENTION

1. Field of the Invention

The present invention relates to a liquid crystal display device, and more particularly to a liquid crystal display device of an in-plane switching mode capable of improving a transmittance and a contrast ratio of the liquid crystal display device.

2. Discussion of the Related Art

A liquid crystal display device displays an image by adjusting a light transmittance of liquid crystals. The liquid crystal display device has various modes according to the arrangement of liquid crystal molecules. For example, the liquid crystal display device has a twisted nematic (TN) mode to control the liquid crystal directors by a vertical electric field and an in-plane switching mode to control the liquid crystal directors by a horizontal electric field.

The TN mode liquid crystal display device drives liquid crystals by a vertical electric field formed between pixel electrodes and common electrodes disposed on upper and lower substrates to face each other. The TN mode liquid crystal display device has an advantage of a large opening ratio, but has a disadvantage of a small viewing angle.

The in-plane switching mode liquid crystal display device includes a color filter array substrate and a thin film array substrate, which are disposed to face each other and have a liquid crystal layer disposed therebetween. The color filter array substrate includes black matrices for preventing light leakage and a color filter layer for imparting colors to the black matrices. The thin film transistor substrate includes gate lines and data lines defining unit pixels, thin film transistors formed at crossing positions of the gate lines and the data lines, and common electrodes and pixel electrodes formed parallel to each other to generate a horizontal electric field.

The in-plane switching mode liquid crystal display device has excellent viewing angle characteristics by a liquid crystal driving method using a horizontal electric field of common electrodes and pixel electrodes.

Referring to FIG. 1, a liquid crystal display device of a horizontal electric field application type includes a thin film transistor array 10 and a color filter array 15 facing each other while liquid crystals 9 are interposed therebetween. The color filter array 15 includes black matrices 3, color filters 5 and an overcoat layer 7 which are sequentially formed on an upper substrate 1. The black matrices 3 prevent light leakage and light interference between neighboring color filters. The color filters 5 include red (R), green (G) and blue (B) color filters such that light passing through the color filters 5 can express colors. The overcoat layer 7 serves to planarize the upper substrate 1 having the black matrices 3 and the color filters 5.

The thin film transistor array 10 includes gate lines 12 and data lines 14 which cross each other on a lower substrate 11 to define pixel regions, thin film transistors (TFTs) which are respectively connected to the gate lines 12 and the data lines 14, pixel electrodes 18 connected to the thin film transistors (TFTs), common electrodes 19 parallel to the pixel electrodes 18, and common lines 16 connected to the common electrodes 19.

The thin film transistors (TFTs) supply data signals from the data lines 14 to the pixel electrodes 18 in response to gate signals from the gate lines 12. An electric field is formed between the pixel electrodes 18 supplied with the data signals through the thin film transistors (TFTs) and the common electrodes 19 supplied with reference voltages through the common lines 16. The common electrodes 19 and the pixel electrodes 18 may be formed on different layers or the same layer. If the common electrodes 19 and the pixel electrodes 18 are formed on different layers, the common electrodes 19 are connected to the common lines 16 and supplied with reference voltages from the common lines 16. On the other hand, if the common electrodes 19 and the pixel electrodes 18 are formed on the same layer, the common electrodes 19 are connected to the common lines 16 through contact holes for exposing the common lines 16 and are supplied with reference voltages from the common lines 16.

If an electric field is formed between the pixel electrodes 18 and common lines 16, the liquid crystals 9 are rotated by the electric field. The rotation of the liquid crystals 9 is controlled according to the data signals.

An upper polarizing plate 2a and a lower polarizing plate 2b are attached to an outer surface of the upper substrate 1 and an outer surface of a lower substrate 11, respectively, to transmit light vibrating in a specific direction. Generally, a transmission axis x of the upper polarizing plate 2a and a transmission axis y of the lower polarizing plate 2b are arranged perpendicularly to each other.

An initial arrangement state of the transmission axes x and y of the polarizing plates 2a and 2b and the liquid crystals 9 is a factor for determining a display mode of the liquid crystal display device. Generally, the liquid crystal display device of an in-plane switching mode has a normally black mode which displays black on the screen if an electric field is not formed.

If an electric field is formed between the pixel electrodes 18 and the common electrodes 19 in the normally black mode, the liquid crystals 9 are arranged parallel to the electric field. In this case, the liquid crystals 9 should be driven by an angle larger than a specific angle from the initial arrangement state by the electric field to influence a transmittance. The light passing through the liquid crystals 9 arranged parallel to the electric field mainly passes through the lower polarizing plate 2b to represent gradation. However, since light passing through a portion of the liquid crystals 9 cannot pass through the lower polarizing plate 2b, it is impossible to influence a transmittance of the liquid crystal display device of an in-plane switching mode. The liquid crystals 9 incapable of influencing a transmittance are generated since an electric field is formed in an undesired direction in a certain region due to structural characteristics of the pixel electrodes 18, the common electrodes 19 and the common lines 16.

FIGS. 2A and 2B illustrate enlarged views of regions in which an electric field is formed in an undesired direction. Further, in FIGS. 2A and 2B, the direction of electric field is represented by bidirectional arrows (↔)

Referring to FIGS. 2A and 2B, the pixel electrodes 18 and the common electrodes 19 include a number of fingers 18a and 19a formed parallel to each other in the pixel regions. Meanwhile, in order that signals are applied to pixel electrode fingers 18a and common electrode fingers 19a, it is necessary to provide connecting portions which are formed perpendicularly to the fingers 18a and 19a of the respective electrodes so as to connect the fingers 18a and 19a of the respective electrodes and supply signals thereto.

For example, as shown in FIG. 2A, the pixel electrodes 18 and the common electrodes 19 may be formed on the same layer. In this case, the pixel electrodes 18 include a number of pixel electrode fingers 18a and pixel electrode connecting portions 18b which are formed perpendicularly to the pixel electrode fingers 18a to connect the pixel electrode fingers 18a. Further, the common electrodes common electrodes 19 include a number of common electrode fingers 19a.

As another example, as shown in FIG. 2B, the pixel electrodes 18 and the common electrodes 19 may be formed on different layers. In this case, the common electrodes 19 include a number of common electrode fingers 19a parallel to each other. The common electrode fingers 19a are connected to the common lines 16 formed perpendicularly to the common electrode fingers 19a and are supplied with reference voltages. Further, the pixel electrodes 18 include the pixel electrode fingers 18a parallel to the common electrode fingers 19a and pixel electrode connecting portions which are formed perpendicularly to the pixel electrode fingers 18a to connect the pixel electrode fingers 18a.

When signals are supplied to the pixel electrodes 18 and the common electrodes 19 of the in-plane switching mode liquid crystal display device, the direction of electric field applied to most of the pixel regions faces the pixel electrode fingers 18a and the common electrode fingers 19a. However, in regions adjacent to the common lines 16 and the pixel electrode connecting portions 18b, the direction of electric field faces the common lines 16 and the pixel electrode connecting portions 18b. As for the reason, the common lines 16 and the pixel electrode connecting portions 18b are formed perpendicularly to the fingers 18a and 19a to distort the electric field formed between the common electrode fingers 19a and the pixel electrode fingers 18a. The distortion of electric field due to the common lines 16 and the pixel electrode connecting portions 18b causes a nonuniform direction of electric field in regions adjacent to the common lines 16 and the pixel electrode connecting portions 18b, that is, pixel region edge portions. In the regions having a nonuniform direction of electric field, there are generated an inefficient driving region A in which the liquid crystals are driven in a direction incapable of influencing a transmittance and a disclination region B in which the liquid crystals are driven in opposite directions not to transmit light at a boundary thereof.

The inefficient driving region A and the disclination region B deteriorate a transmittance and a contrast ratio of the liquid crystal display device, thereby reducing display quality of the in-plane switching mode liquid crystal display device.

SUMMARY OF THE INVENTION

Accordingly, the present invention is directed to a liquid crystal display device of an in-plane switching mode and a method for manufacturing the same that substantially obviate one or more problems due to limitations and disadvantages of the related art.

An object of the present invention is to provide a liquid crystal display device of an in-plane switching mode capable of improving a transmittance and a contrast ratio of the liquid crystal display device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal display device of an in-plane switching mode comprises: gate lines and data lines which cross each other on a substrate to define pixel regions; thin film transistors which are formed at crossing portions of the gate lines and the data lines; first common lines formed on the same layer as the gate lines; first electrodes which have a plurality of first fingers and include L-shaped protruded patterns at one ends of the first fingers in the pixel regions; and second electrodes which have second fingers formed alternately with the first fingers and include I-shaped patterns at one ends of the second fingers in the pixel regions, wherein the L-shaped protruded patterns and the I-shaped patterns overlap partly with the first common lines.

The in-plane switching mode liquid crystal display device according to the present invention has the following effects.

The L-shaped edge patterns extended from the fingers are alternately arranged in the lower edge portions of the pixel regions, and the edge patterns extended from the fingers and having an inclination are alternately arranged in the upper edge portions of the pixel regions. Accordingly, it is possible to improve uniformity of the direction of electric field and to sharply reduce an inefficient driving region and a disclination region. Thus, the thin film transistor substrate of an in-plane switching mode according to the embodiments of the present invention can improve the transmittance and the contrast ratio of the liquid crystal display device of a horizontal electric field application type.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, a liquid crystal display device of an in-plane switching mode according to embodiments of the present invention will be described in detail with reference to the accompanying drawings.

<First Embodiment>

Figure 1:
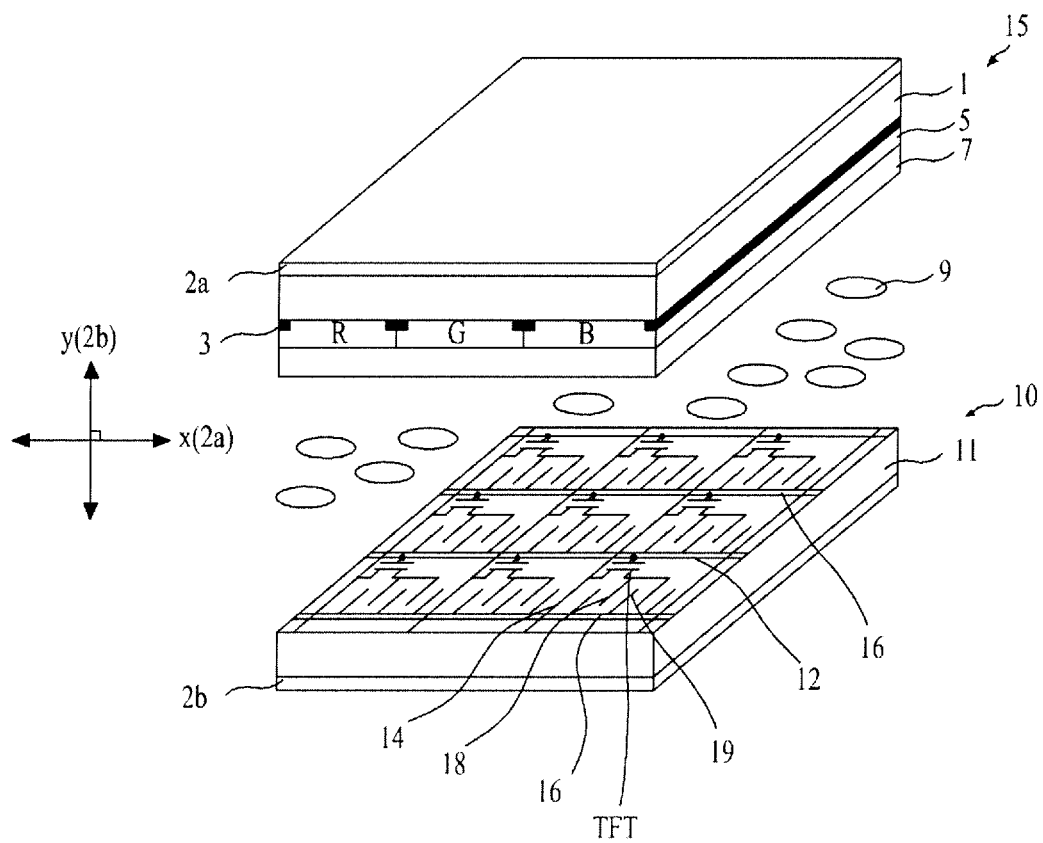
FIG. 1 schematically illustrates a conventional liquid crystal display device of an in-plane switching mode.
Figure 2A:
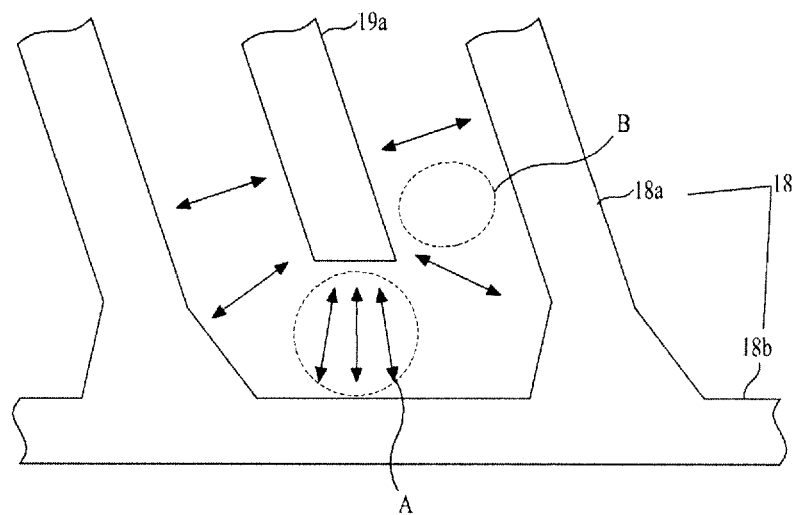
FIGS. 2A and 2B illustrate diagrams for explaining an electric field formed in lower edge portions of pixel regions in a conventional liquid crystal display device of an in-plane switching mode.
Figure 2B:
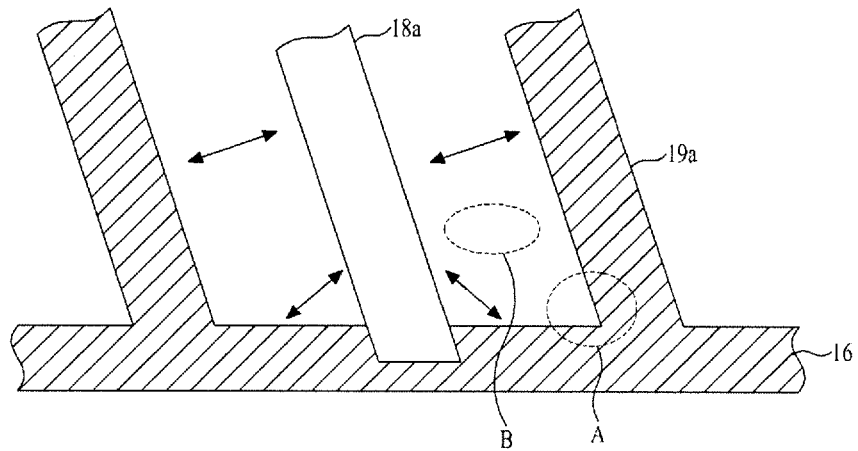
Figure 3:
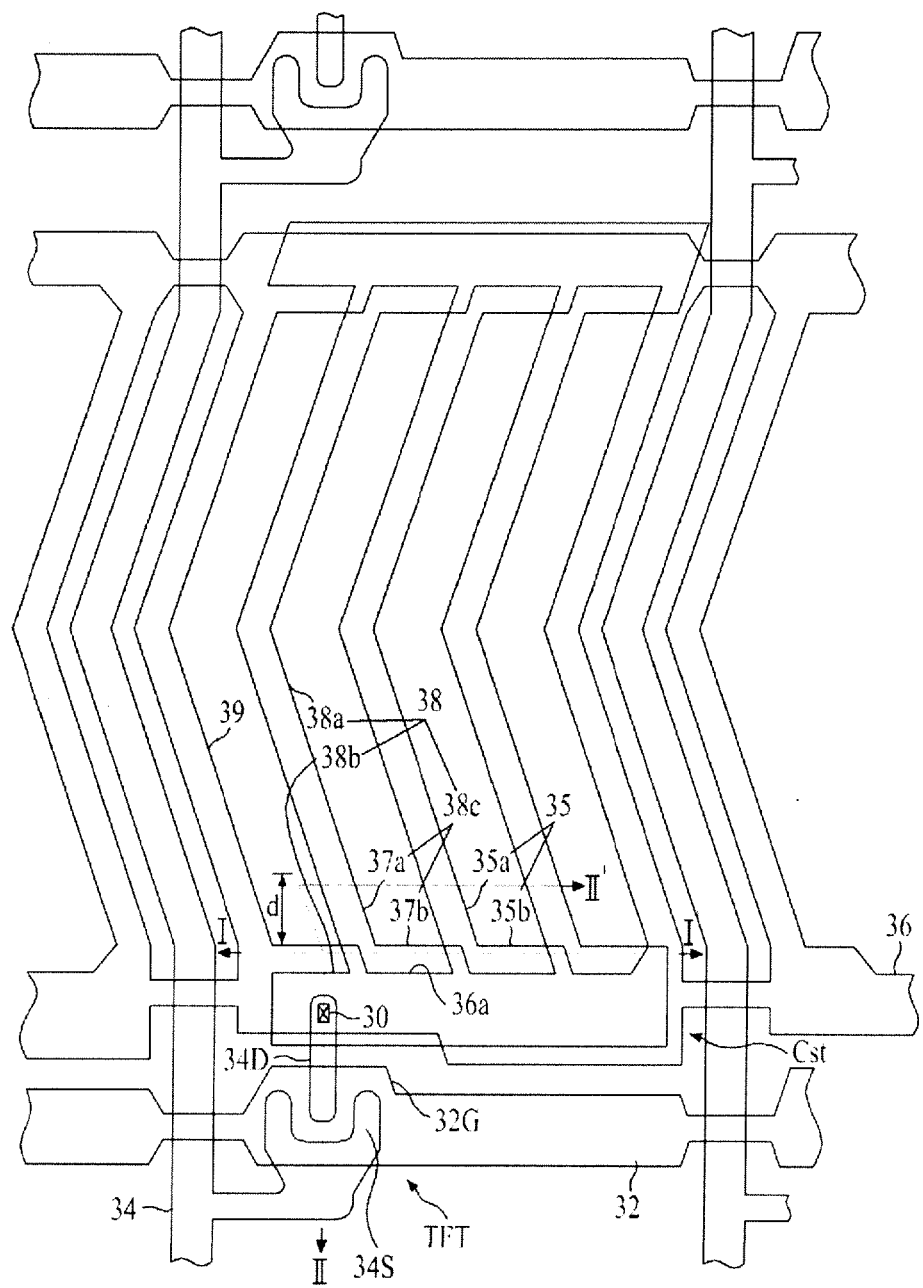
FIG. 3 illustrates a plan view of a thin film transistor substrate of an in-plane switching mode liquid crystal display device according to a first embodiment of the present invention.
Figure 4:
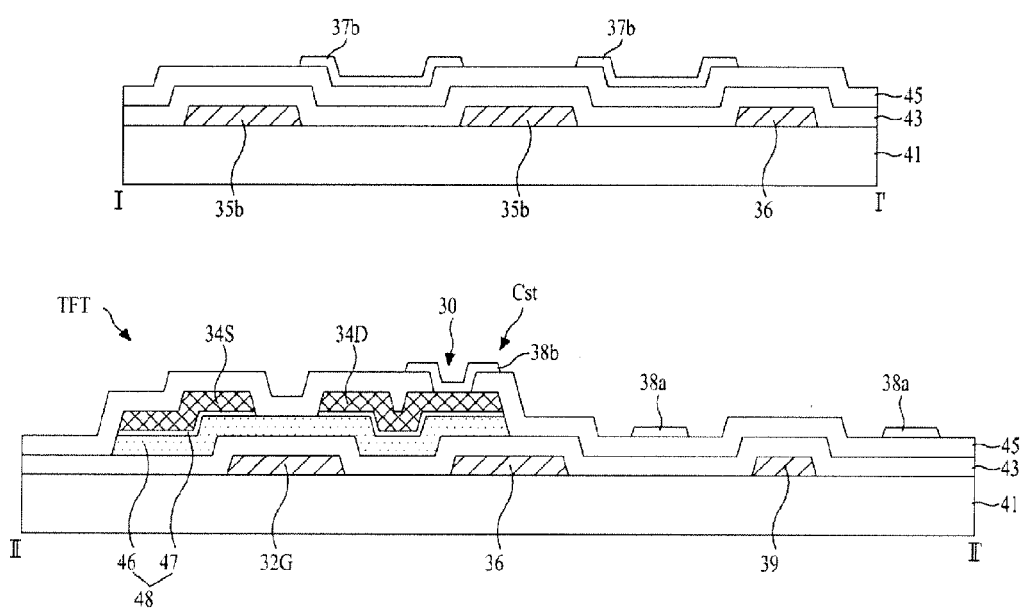
FIG. 4 illustrates sectional views taken along lines I-I' and II-II' of FIG. 3.

FIG. 3 illustrates a plan view of a thin film transistor substrate of an in-plane switching mode liquid crystal display device according to a first embodiment of the present invention, and FIG. 4 illustrates sectional views taken along lines I-I' and II-II' of FIG. 3.

Referring to FIGS. 3 and 4, the thin film transistor substrate of the in-plane switching mode liquid crystal display device according to the first embodiment of the present invention includes, on a substrate 41, a plurality of gate lines 32 and a plurality of data lines 34 crossing each other to define pixel regions, thin film transistors (TFT) formed at respective crossing portions of the gate lines 32 and the data lines 34, and common lines 36 formed on the same layer as the gate lines 32. Further, the thin film transistor substrate includes, in each pixel region, a plurality of first fingers 39, second fingers 38a formed alternately with the first fingers 39, first edge patterns 35 protruded in an "L" shape at one ends of the first fingers 39, and second edge patterns 38c (37a and 37b) protruded in an "L" shape of the same shape as the first edge patterns 35 at one ends of the second fingers 38a. In this case, the first edge patterns 35 of the first fingers 39 and the second edge patterns 38c of the second fingers 38a of second electrodes 38 overlap partly with the common lines 36. In this embodiment, the first electrodes and the second electrodes may be defined as common electrodes and pixel electrodes, respectively, and vice versa. These definitions may also be applied to the other embodiments hereinafter.

Further, the first edge patterns 35 of one sides of the first fingers (the common electrode fingers) 39 are formed as a single body with the common lines 36. Further, in the pixel regions, the common lines 36 include first common lines and second common lines which are spaced from gate lines 32 defining the pixel regions and are symmetrically formed at upper and lower sides. Hereinafter, for simplicity, the first and second common lines are commonly referred to as the common lines 36.

Further, the second electrodes 38 include pixel electrode connecting portions 38b parallel to horizontal portions of the common lines 36, a number of second fingers (the pixel electrode fingers) 38a which are connected to the pixel electrode connecting portions 38b and formed parallel to the first fingers 39, and the second edge patterns 38c which are formed at one ends of the second fingers 38a.

In this case, the first edge patterns 35 and the second edge patterns 38c are symmetrically formed corresponding to the common lines positioned at the upper and lower sides without separation. That is, the same L-shaped patterns are correspondingly formed at the other ends of the first fingers 39 and the second fingers 38a.

Further, storage capacitors Cst are formed between the common lines 36 and the pixel electrode connecting portions 38b overlapping with the common lines 36.

The second fingers 38a of the second electrode 38 and the first fingers 39 are driven by forming a horizontal electric field therebetween when voltages are applied thereto. In this case, the gate lines 32 and the data lines 34 are formed while a gate insulating film 43 is interposed therebetween. The thin film transistors (TFTs) are connected to the gate lines 32 and the data lines 34. The second electrodes 38 are connected to the thin film transistors (TFT).

The gate lines 32 and the data lines 34 are connected to pad terminals connected to a driving circuit at the outside of a thin film transistor array to supply gate signals and data signals to the thin film transistors (TFTs). Further, the common lines 36 are separated from the gate lines 32 and formed on the same layer as the gate lines 32 to supply reference voltages for driving liquid crystals to the first fingers 39.

The thin film transistors (TFTs) supply the data signals of the data lines 34 to the second electrodes 38 in response to the gate signals of the gate lines 32. For this operation, the thin film transistors (TFTs) include gate electrodes 32G connected to the gate lines 32, source electrodes 34S connected to the data lines 34, drain electrodes 34D connected to the second electrodes 38, and semiconductor patterns 48 overlapping with the gate electrodes 32G while the gate insulating film 43 is interposed therebetween and connected to the source electrodes 34S and the drain electrodes 34D.

The semiconductor patterns 48 include active layers 46 and ohmic contact layers 47 formed on the active layers 46. The active layers 46 are exposed between the source electrodes 34S and the drain electrodes 34D to form semiconductor channels. The ohmic contact layers 47 allow ohmic contact between the active layers 46 and the source electrodes 34S, and between the active layers 46 and the drain electrodes 34D. The semiconductor patterns 48 are overlappingly disposed under a source/drain conductive pattern group including the source electrodes 34S, the drain electrodes 34D and the data lines 34 according to the features of a manufacturing process.

The common lines 36 are separated from the gate lines 32 and formed parallel to the gate lines 32. The first edge patterns 35 are formed between the common lines 36 and the first fingers 39. The first edge patterns 35 include first edge portion 35a extended from the first fingers 39 and second edge portions 35b formed as the horizontal portions of the common lines 36 at an obtuse angle with the first edge portion 35a. Since an angle between the first and second edge portions ranges from 100 to 115 degrees, the first and second edge portions are formed in an "L" shape. The first edge patterns 35 and the second edge patterns 38c improve uniformity of the direction of electric field.

The second electrodes 38 are connected to the drain electrodes 34D via pixel contact holes 30 which pass through a passivation film 45 covering a source/drain conductive pattern to expose the drain electrodes 34D. Accordingly, the second electrodes 38 are supplied with the data signals passing through the drain electrodes 34D.

Between the pixel electrode connecting portions 38b and the second fingers 38a, the second edge patterns 38c include first edge portions 37a extended from the second fingers 38a and second edge portions 37b formed parallel to the pixel electrode connecting portions at an obtuse angle with the first edge portions 37a. The first and second edge portions 37a and 37b have an angle which ranges from 100 to 115 degrees, thereby forming an "L" shape.

In this case, the common lines 36 meet the second edge portions 37b of the second edge patterns 38c. The common lines 36 include reduction portions 36a having a reduced width. The reduction portions 36a and the second edge portions 35b of the first edge patterns 35, adjacent to the reduction portions 36a on the left and right sides, have a stepped shape on a plan view.

Figure 5:
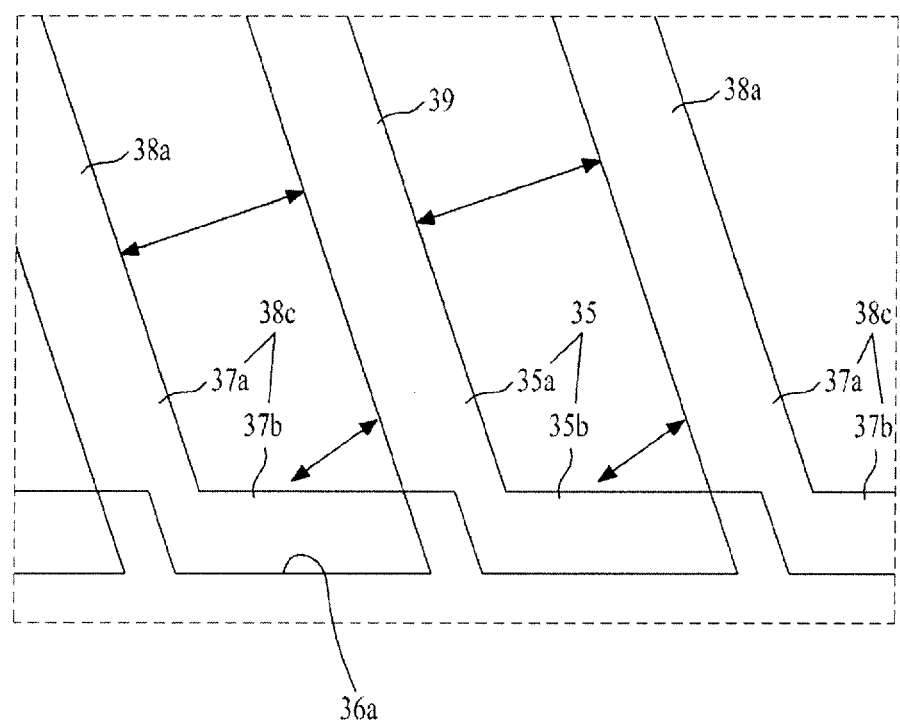
FIG. 5 illustrates a diagram for explaining an electric field formed in lower edge portions of pixel regions in the thin film transistor substrate of the in-plane switching mode liquid crystal display device according to the first embodiment of the present invention.

The first edge patterns 35 and the second edge patterns 38c are alternately arranged, and the first fingers 39 and the second fingers 38a are also alternately arranged. Accordingly, when signals are applied to the second electrodes (the pixel electrodes) 38 and the common lines 36, as shown in FIG. 5, a horizontal electric field is formed between the first fingers 39 and the second fingers 38a.

Further, an electric field having a direction similar to the electric field formed between the first fingers 39 and the second fingers 38a is also between the first edge patterns 35 and the second edge patterns 38c. For reference, bidirectional arrows ( ↔ ) in FIG. 5 represent the direction of electric field in a case where reference voltages are supplied to the common lines 36 and random data voltages are supplied to the second electrodes 38.

The storage capacitors Cst are configured by overlapping the pixel electrode connecting portions 38b and the common lines 36 while the passivation film 45 and the gate insulating film 43 are interposed therebetween. The storage capacitors Cst allow the data signals charged in the second electrodes 38 passing through the thin film transistors (TFTs) to be stably maintained in the second electrodes 38.

As described above, in the thin film transistor substrate of an in-plane switching mode according to the first embodiment of the present invention, the L-shaped first edge patterns 35 and the L-shaped second edge patterns 38c are connected to the ends of the first fingers 39 and the second fingers 38a, respectively. Accordingly, an electric field can be formed in regions where the pixel electrode connecting portions 38b are adjacent to the common lines 36 (i.e., lower edge portions of the pixel regions) in a direction similar to a direction of other regions. In this case, the lower edge portions of the pixel regions mean regions having a distance d of 26~28 μm from the ends of the first edge portions 35a and 37a and one ends of the second edge portions 35b and 37b of the first and second edge patterns 35 and 38c.

Accordingly, it is possible to improve uniformity of the direction of electric field formed in the pixel regions and to sharply reduce an inefficient driving region and a disclination region.

<Second Embodiment>

Figure 6:
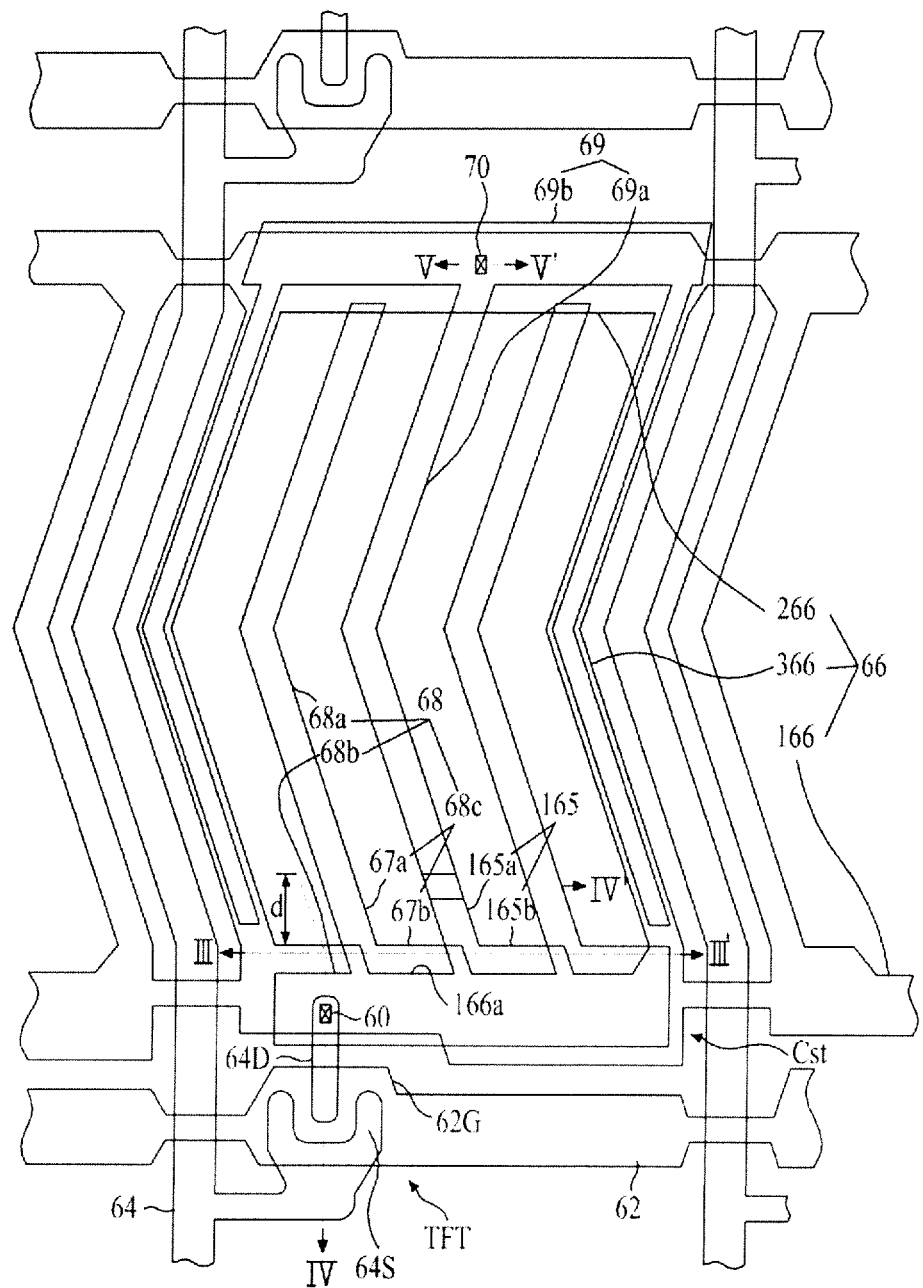
FIG. 6 illustrates a plan view of a thin film transistor substrate of an in-plane switching mode according to a second embodiment of the present invention.
Figure 7:
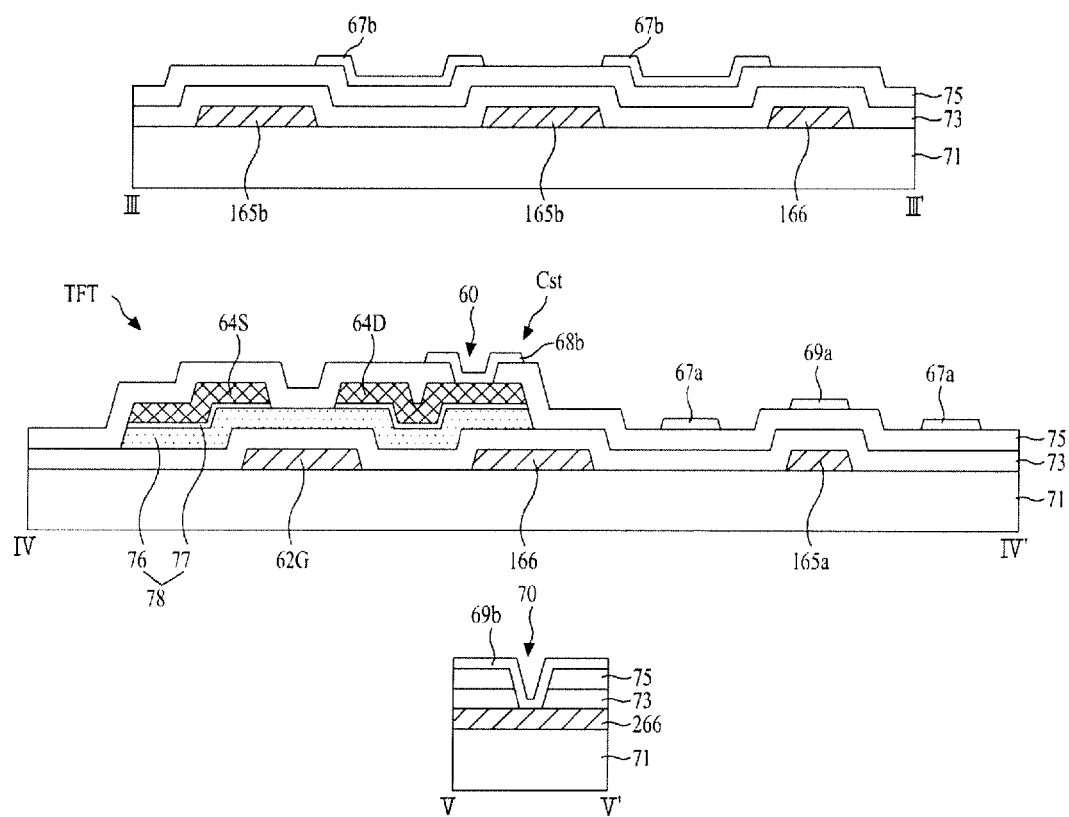
FIG. 7 illustrates sectional views taken along lines III-III', IV-IV' and V-V' of FIG. 6.

FIG. 6 illustrates a plan view of a thin film transistor substrate of an in-plane switching mode according to a second embodiment of the present invention, and FIG. 7 illustrates sectional views taken along lines III-III', IV-IV' and V-V' of FIG. 6.

Referring to FIGS. 6 and 7, the thin film transistor substrate according to the second embodiment of the present invention includes a plurality of gate lines 62 and a plurality of data lines 64 crossing each other to define pixel regions while a gate insulating film 73 is interposed therebetween on a substrate 71, thin film transistors (TFTs) connected to the gate lines 62 and the data lines 64, second electrodes 68 connected to the thin film transistors (TFTs), common electrodes 69 forming a horizontal electric field with the second electrodes 68, common lines 66 connected to the common electrodes 69, and storage capacitors Cst configured by overlapping the second electrodes 68 and the common lines 66.

The detailed description of the gate lines 62, the data lines 64, the thin film transistors (TFTs), and the storage capacitors Cst according to the second embodiment of the present invention are the same as the description of the first embodiment of the present invention.

The common lines 66 are formed to be separated from the gate lines 62. Further, the common lines 66 include first fingers 69a, and first horizontal portions 166 and second horizontal portions 266 which face each other while regions for forming second fingers 68a are interposed therebetween. The first and second horizontal portions 166 and 266 are connected to each other by shield patterns 366 at the edges of the pixel regions. In this case, the first fingers 69a and the second fingers 68a are formed of transparent electrodes on the same layer.

In this case, first edge patterns 165 include first edge portions 165a having an extending direction from the first fingers 69a, and second edge portions 165b having a traveling direction of the first horizontal portions 166 of the common lines 66 and protruded therefrom. In this case, the first edge portions 165a and the second edge portions 165b form an obtuse angle. The first and second edge portions 165a and 165b have an angle which ranges from 100 to 115 degrees, thereby forming an "L" shape. The first edge patterns 165 and the second edge patterns 68c of the second electrodes 68 to be described later improve uniformity of the direction of electric field.

The first electrodes 69 include common electrode connecting portions 69b overlapping with the second horizontal portions 266 and a number of first fingers 69a connected to the common electrode connecting portions 69b and formed parallel to each other.

Further, in the edges of the pixel regions, the L-shaped protruded patterns described in FIG. 3 are formed between the first horizontal portions 166 and the shield patterns 366. In the pixel regions, I-shaped patterns are formed at one ends of the first fingers 69a, and the first edge patterns 165 are protruded from the first horizontal portions 166 to overlap with the first fingers 69a without separation. The first edge patterns 165 are formed as a single body with the first horizontal portions 166 and made of light blocking metal.

The common electrode connecting portions 69b are connected to the common lines 66 via common contact holes 70 passing through a passivation film 75 and the gate insulating film 73. The first fingers 69a, which are connected to the outermost portions of the common electrode connecting portions 69b, are overlappingly formed on the shield patterns 366 in order to efficiently ensure effective opening regions.

In this case, the first edge patterns 165 and the first fingers 69a are formed without separation. The first edge patterns 165 are supplied with common voltage signals from the first horizontal portions 166. Accordingly, the first edge patterns 165 can also have a uniform electric field effect as in the second fingers 68a, thereby minimizing a disclination region.

The second electrodes 68 include pixel electrode connecting portions 68b parallel to the first horizontal portions 166, a number of second fingers 68a which are connected to the pixel electrode connecting portions 68b and formed parallel to the first fingers 69a. Second edge patterns 68c are formed between the pixel electrode connecting portions 68b and the second fingers 68a. The second edge patterns 68c include first edge portions 67a extended from the second fingers 68a and second edge portions 67b formed parallel to the pixel electrode connecting portions 68b at an obtuse angle with the first edge portions 67a. The first and second edge portions 67a and 67b have an angle which ranges from 100 to 115 degrees, thereby forming an "L" shape. The second electrodes 68 are connected to drain electrodes 64D via pixel contact holes 60 which pass through a passivation film 75 covering the source/drain conductive pattern to expose the drain electrodes 64D. Accordingly, the second electrodes 68 are supplied with the data signals passing through the drain electrodes 64D.

In this case, the first horizontal portions 166 and the shield patterns 366 are connected to each other as a single body. In their connecting portions, the first horizontal portions 166 have L-shaped protruded patterns. The first horizontal portions 166 include reduction portions 166a having a reduced width at positions where the first horizontal portions 166 meet the second edge portions 67b serving as horizontal portions of the second edge patterns 68c. The reduction portions 166a and the L-shaped protruded patterns or the horizontal portions of the first edge patterns 165, adjacent to the reduction portions 166a on the left and right sides, have a stepped shape on a plan view.

Figure 8:
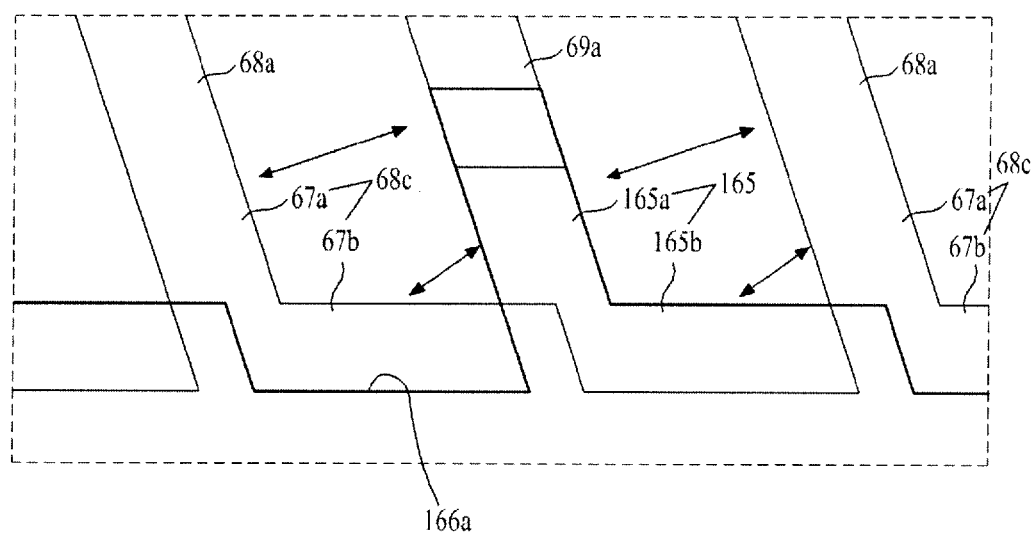
FIG. 8 illustrates a diagram for explaining an electric field formed in lower edge portions of pixel regions in the thin film transistor substrate of the in-plane switching mode liquid crystal display device according to the second embodiment of the present invention.

In this case, the first edge patterns 165 and the second edge patterns 68c are alternately arranged, and the first fingers 69a and the second fingers 68a are also alternately arranged. Accordingly, when signals are applied to the second electrodes 68 and the common lines 66, as shown in FIG. 8, a horizontal electric field is formed between the first fingers 69a and the second fingers 68a. Further, an electric field having a direction similar to the electric field formed between the first fingers 69a and the second fingers 68a is also formed between the first edge patterns 165 and the second edge patterns 68c. For reference, bidirectional arrows (↔) in FIG. 8 represent a direction of electric field in a case where reference voltages are supplied to the common lines 66 and random data voltages are supplied to the second electrodes 68.

In the second embodiment of the present invention, it is possible to further improve the transmittance of the pixel regions by forming the first fingers 69a and the second fingers 68a using transparent conductive metal.

As described above, in the thin transistor substrate of an in-plane switching mode according to the second embodiment of the present invention, the L-shaped first edge patterns 165 and the L-shaped second edge patterns 68c are connected to the first fingers 69a and the second fingers 68a, respectively. Accordingly, an electric field can be formed in regions where the pixel electrode connecting portions 68b are adjacent to the first horizontal portions 166 of the common lines (i.e., lower edge portions of the pixel regions) in a direction similar to a direction of other regions. Thus, it is possible to improve uniformity of the direction of electric field formed in the pixel regions and to sharply reduce an inefficient driving region and a disclination region. In this case, the lower edge portions of the pixel regions mean regions having a distance d of 26~28 μm from the ends of the first and second edge portions 165a and 68c and one ends of the second edge portions 165b and 67b of the first and second edge patterns 165 and 68c.

From the experiment results, it can be seen that transmittances of the lower edge portions of the liquid crystal display devices including thin film transistors of an in-plane switching mode according to the first and second embodiments of the present invention are increased by 50% or more and the total transmittance is increased variously according to models of the liquid crystal display devices as shown in Table 1.

TABLE 1

| Size (inch) | Product model | Aspect ratio | Resolution | | Size of unit pixel | | Application effect |
|---|---|---|---|---|---|---|---|
| | | | H(horizontal) | V(vertical) | H(mm) | V(mm) | |
| 47 | Full HD | 16:9 | 1920 | 1080 | 0.18050 | 0.54150 | ~5.0% |
| 47 | HD | 16:9 | 1366 | 768 | 0.76125 | 0.25375 | ~10.6% |
| 42 | Full HD | 16:9 | 1920 | 1080 | 0.16150 | 0.48450 | ~5.6% |
| 42 | HD | 16:9 | 1366 | 768 | 0.68100 | 0.22700 | ~11.9% |
| 37 | Full HD | 16:9 | 1920 | 1080 | 0.14225 | 0.42675 | ~6.3% |
| 37 | HD | 16:9 | 1366 | 768 | 0.6 | 0.2 | ~13.5% |

Hereinafter, a method for manufacturing a thin film transistor substrate according to the first embodiment of the present invention will be described with reference to FIG. 9A to 12B.

Figure 9A:
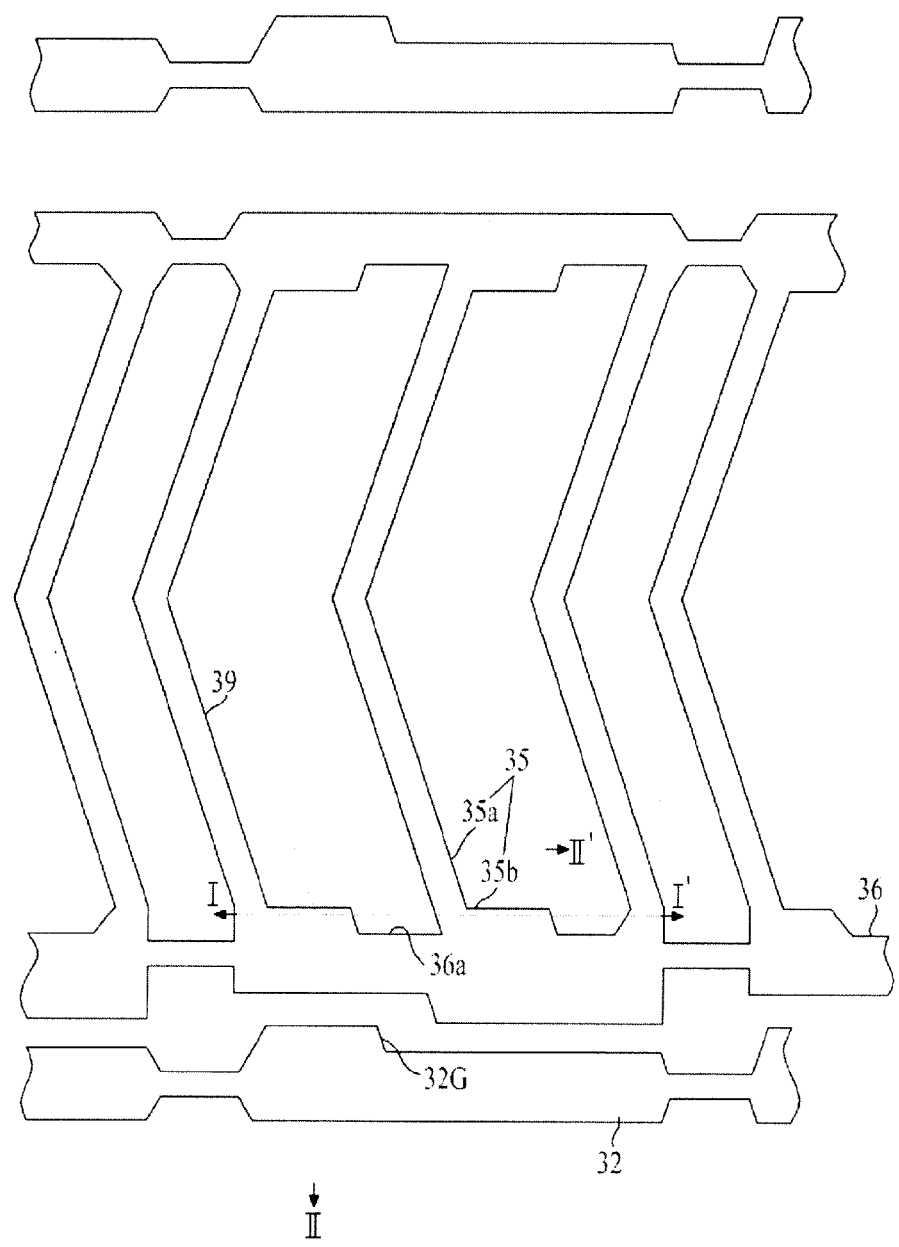
FIGS. 9A to 12B illustrate diagrams for explaining a method for manufacturing a thin film transistor substrate according to the first embodiment of the present invention.
Figure 9B:
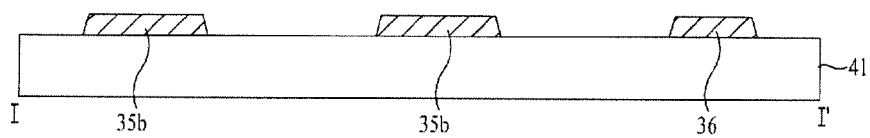
Figure 9B:
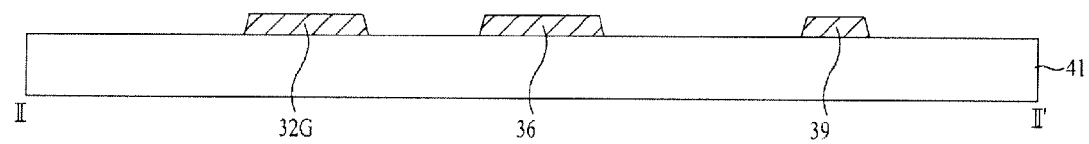

Referring to FIGS. 9A and 9B, a first conductive pattern including the gate lines 32, the gate electrode 32G, the common lines 36, the first fingers 39 and the first edge patterns 35 is formed on the substrate 41 through a first mask process. In this case, the common lines 36 include the first edge patterns 35 protruded in an "L" shape between the first fingers 39 and the reduction portions 36a having a relatively smaller width than the horizontal portions of the first edge patterns 35 between the neighboring first edge patterns 35.

The first conductive pattern is formed by forming a gate metal layer on the substrate 41 and, then, patterning the gate metal layer through the first mask process including a photolithography process and an etching process. The gate metal layer is formed as a single layer or multiple layers using metal such as molybdenum (Mo), aluminum (Al), aluminum-neodymium (Al—Nd), copper (Cu), chromium (Cr) and titanium (Ti), and an alloy thereof.

Figure 10A:
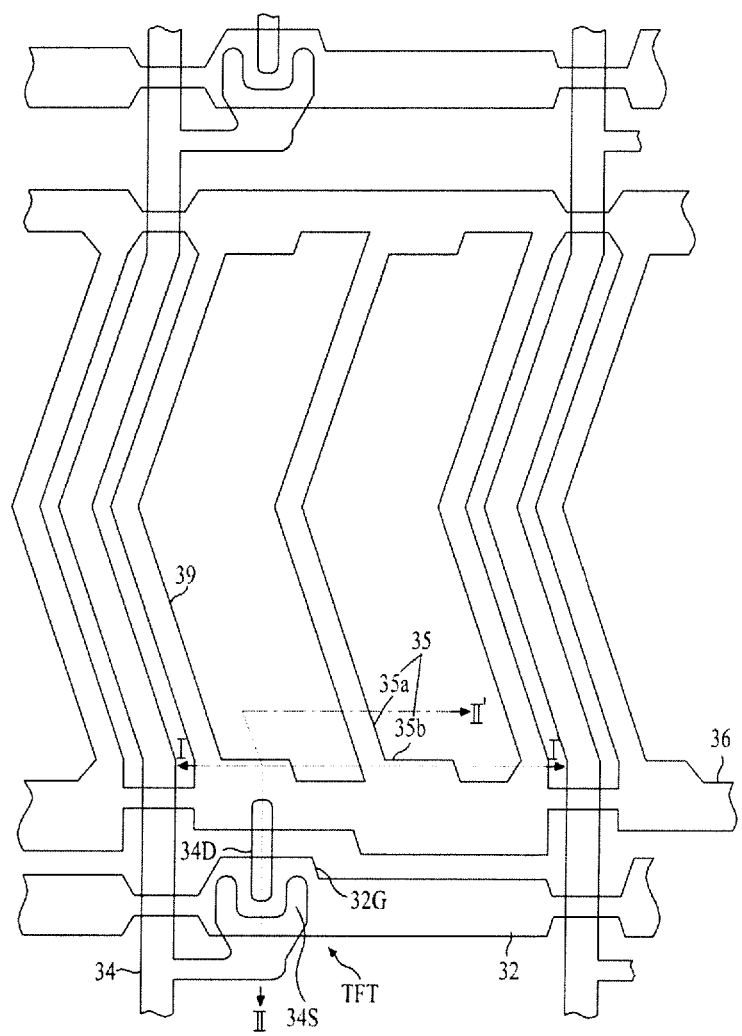
Figure 10B:
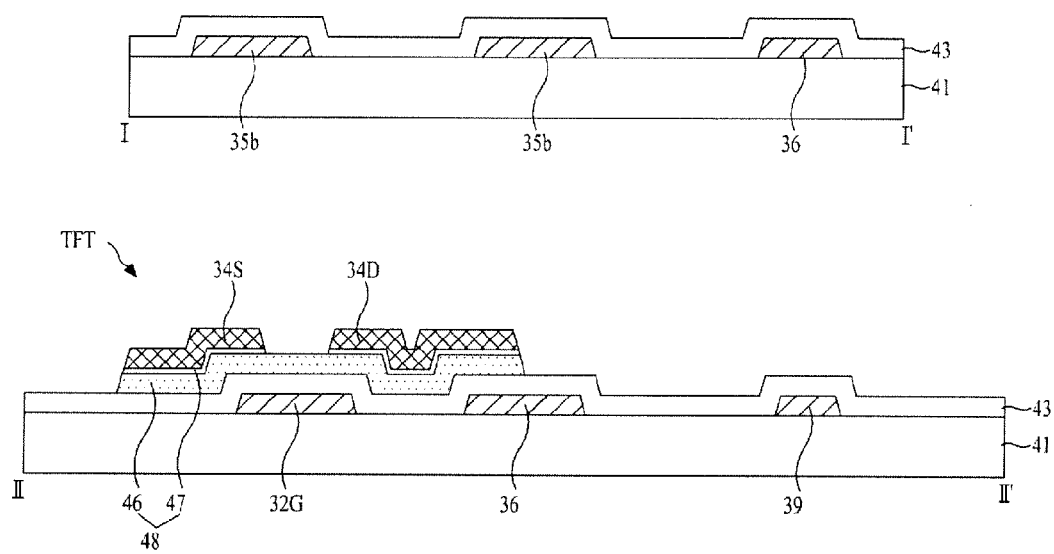

Referring to FIGS. 10A and 10B, the gate insulating film 43 is formed on the substrate 41 to cover the first conductive pattern. Then, the semiconductor patterns 48 and a second conductive pattern including the data lines 34, the source electrodes 34S and the drain electrodes 34D are formed on the gate insulating film 43 through a second mask process.

The gate insulating film 43 is made of an inorganic insulating material such as silicon oxide (SiOx) or silicon nitride (SiNx).

The semiconductor patterns 48 and the second conductive pattern are formed by depositing a semiconductor layer and a source/drain metal layer on the gate insulating film 43 and, then, patterning the semiconductor layer and the source/drain metal layer through the second mask process including a photolithography process and an etching process.

The semiconductor layer is formed by depositing amorphous silicon and amorphous silicon doped with impurities (n+ or p+). The source/drain metal layer is formed as a single layer or multiple layers using metal such as molybdenum (Mo), aluminum (Al), aluminum-neodymium (Al—Nd), copper (Cu), chromium (Cr) and titanium (Ti), a Mo—Ti alloy, a Mo—Nb alloy and a Ti—Nb alloy, and an alloy thereof.

The second mask process employs a half tone mask or a diffraction exposure mask, thereby forming the semiconductor patterns 48 and the second conductive pattern through a single mask process. Accordingly, the semiconductor patterns 48 are overlappingly disposed under the second conductive pattern.

Figure 11A:
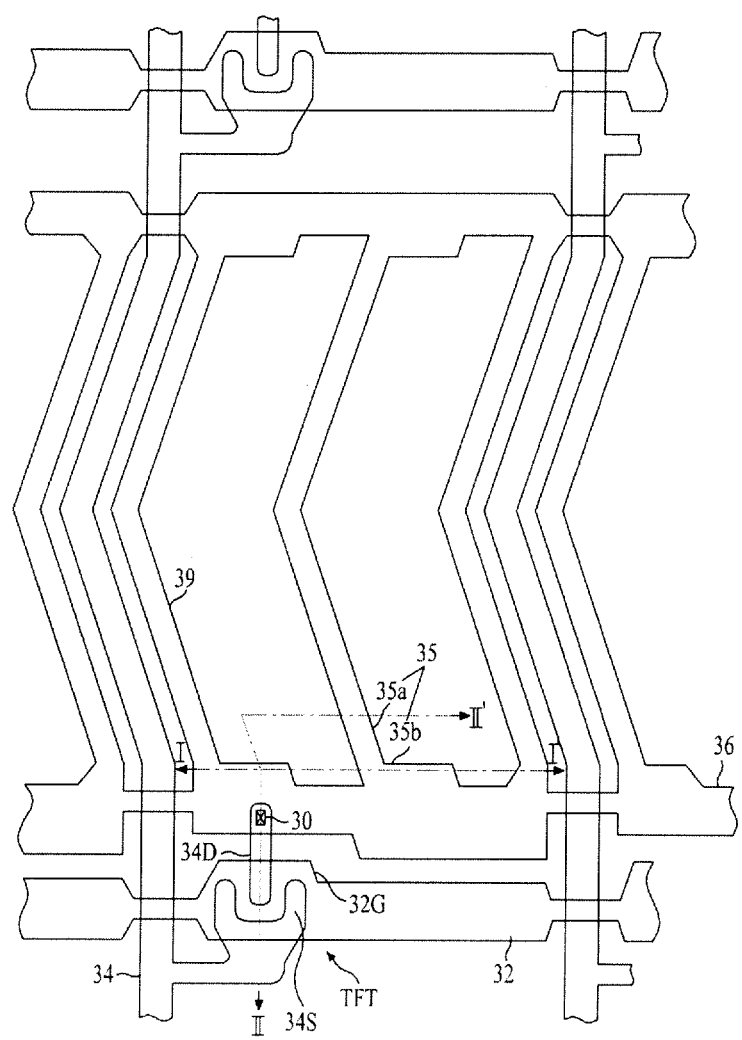
Figure 11B:
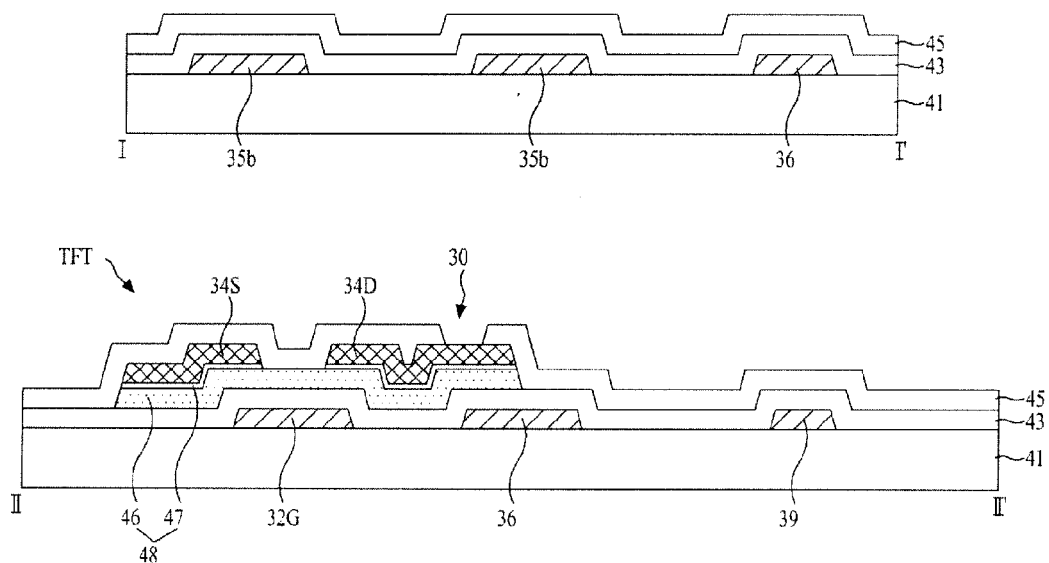

Referring to FIGS. 11A and 11B, the passivation film 45 is formed on the gate insulating film 43 to cover the semiconductor patterns 48 and the second conductive pattern. Then, the pixel contact holes 30 are formed through a second mask process.

The passivation film 45 may be formed by depositing an inorganic insulating material such as silicon oxide (SiOx) or silicon nitride (SiNx) via a deposition method such as a plasma enhanced chemical vapor deposition (PECVD) method. Further, the passivation film 45 may be formed by coating an organic insulating material such as an acrylic organic compound having a small dielectric constant, benzo cyclobutene (BCB), Perfluorocyclobutane (PFBC), Teflon and Cytop via a coating method such as a spin coating method or a spinless coating method.

The pixel contact holes 30 are formed by patterning the passivation film 45 through a third mask process including a photolithography process and an etching process.

Figure 12A:
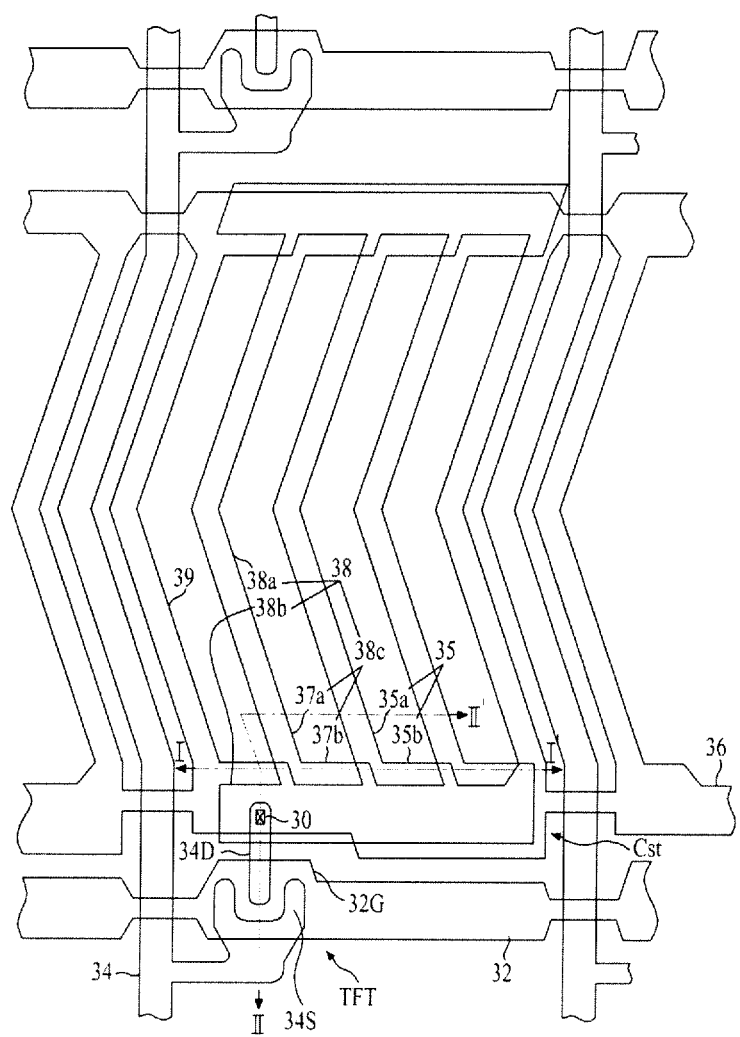
Figure 12B:
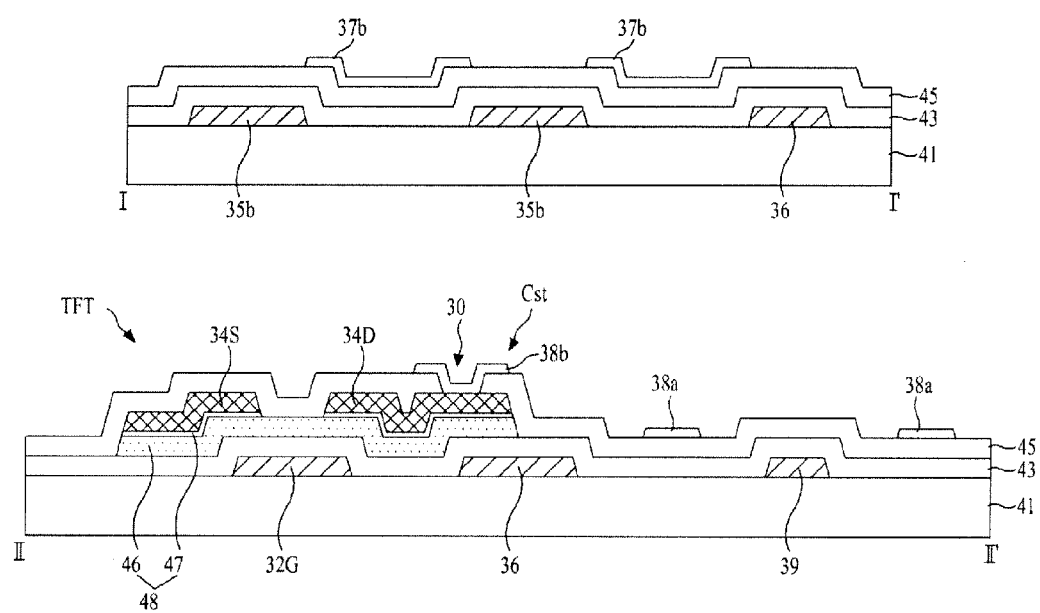

Referring to FIGS. 12A and 12B, a third conductive pattern including the second fingers 38a, the pixel electrode connecting portions 38b and the second edge patterns 38c is formed on the passivation film 45 through a fourth mask process.

The third conductive pattern is formed by forming a transparent conductive metal layer on the passivation film 45 and, then, patterning the transparent conductive metal layer through the fourth mask process including a photolithography process and an etching process.

The transparent conductive metal layer employs indium tin oxide (ITO), tin oxide (TO), indium zinc oxide (IZO) and indium tin zinc oxide (ITZO).

Hereinafter, a thin film transistor substrate according to the second embodiment of the present invention will be described.

A first conductive pattern according to the second embodiment of the present invention, referring to FIGS. 6 to 8, is formed to include the gate lines 62, gate electrodes 62G, the common lines 66 having the first horizontal portions 166 and the second horizontal portions 266 respectively formed at the lower and upper sides of the pixel regions in a horizontal direction, the shield patterns 366 connecting the first and second horizontal portions 166 and 266, and the first edge patterns 165 protruded from the first horizontal portions 166 toward the pixel regions in central portions of the pixel regions.

Semiconductor patterns 78 and a second conductive pattern according to the second embodiment of the present invention are formed by the same method as the method described in FIGS. 10A and 10B. The second conductive pattern according to the second embodiment of the present invention is the same as the second conductive pattern described in FIGS. 10A and 10B.

The pixel contact holes 60 and the common contact holes 70 according to the second embodiment of the present invention are formed by etching at least one of the passivation film 75 and the gate insulating film 73 using the third mask process including a photolithography process and an etching process.

A third conductive pattern according to the second embodiment of the present invention is formed to include the second electrodes 68 and the first electrodes 69 as shown in FIGS. 6 to 8. In this case, the third conductive pattern is made of transparent metal such as ITO or IZO. Further, the second electrodes 68 include the pixel electrode connecting portions 68b formed above the first horizontal portions 166, the second fingers 68a parallel to the data lines 64 in the pixel regions, and the second edge patterns 68c formed as L-shaped protruded patterns between the second fingers 68a and the pixel electrode connecting parts 68b. In this case, the second edge patterns 68c are parallel to the first edge patterns 165 and are formed as a single body with the second fingers 68a and the pixel electrode connecting portions 68b. Further, the first electrodes 69 are formed to include the first fingers 69a parallel to the second fingers 68a, and the common electrode connecting portions 69b formed above the second horizontal portions 266. Further, the first fingers 69a include one l-shaped ends to overlap with the first edge patterns 165 without separation. The first fingers 69a and the first edge portions 165a of the first edge patterns 165 are formed to overlap each other while the gate insulating film 73 and the passivation film 75 are interposed therebetween.

<Third Embodiment>

Figure 13:
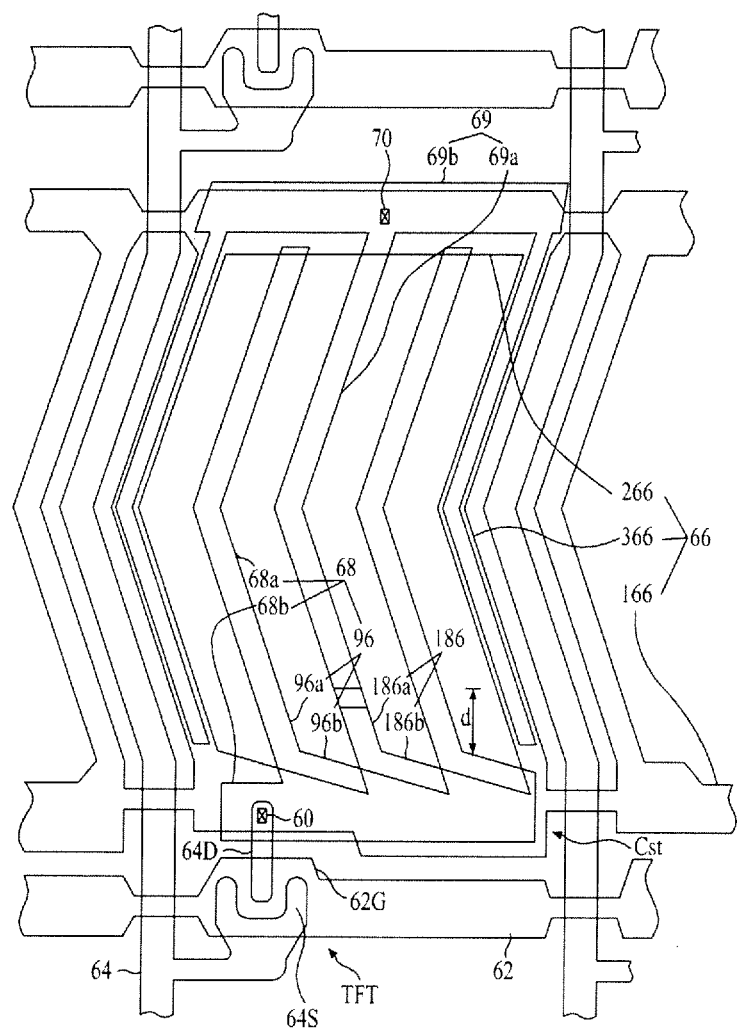
FIG. 13 illustrates a plan view of a thin film transistor substrate of an in-plane switching mode according to a third embodiment of the present invention.
Figure 14:
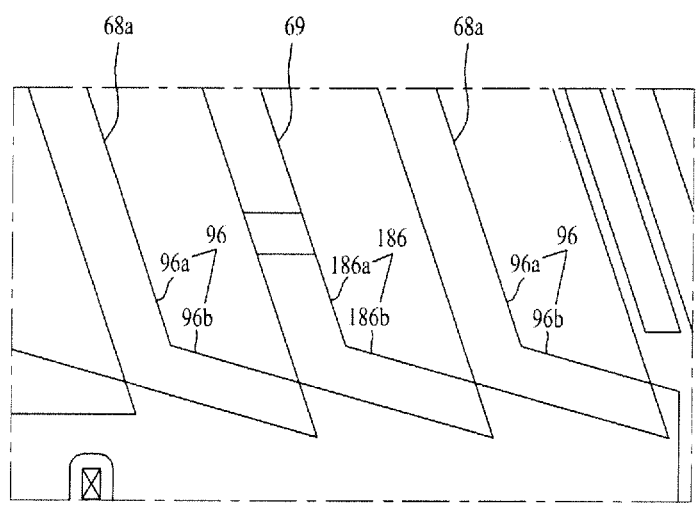
FIG. 14 illustrates an enlarged view of lower edge portions in pixel regions of FIG. 13.

FIG. 13 illustrates a plan view of a thin film transistor substrate of an in-plane switching mode according to a third embodiment of the present invention, and FIG. 14 illustrates an enlarged view of lower edge portions in pixel regions of FIG. 13. The sectional views of the thin film transistor substrate according to the third embodiment of the present invention are the same as the sectional views of the second embodiment. Accordingly, compared to the second embodiment, the description of repeated components is omitted.

Referring to FIGS. 13 and 14, first edge patterns 186 are formed between the first horizontal portions 166 of the common lines 66 and the first fingers 69a. The first edge patterns 186 include first edge portions 186a extended from the first fingers 69a, and second edge portions 186b connected to the first horizontal portions 166 of the common lines 66 and inclined to the first edge portions 186a at an obtuse angle of 120~130 degrees.

Second edge patterns 96 are formed between the pixel electrode connecting portions 68b and the second fingers 68a. The second edge patterns 96 include first edge portions 96a extended from the second fingers 68a, and second edge portions 96b connected to the pixel electrode connecting portions 68b and inclined to the first edge portions 96a at an obtuse angle of 120~130 degrees.

That is, the second edge portions 96b are bent such that the second edge portions 96b and the first horizontal portions 166 have different angles. The obtuse angle between the first edge portions 96a and the second edge portions 96b is larger than the angle between the first edge portions 96a and the first horizontal portions 166.

As described above, an electric field having a direction similar to the horizontal electric field formed between the first fingers 69a and the second fingers 68a is also between the first and second edge patterns 186 and 96 by forming the angles between the first edge portions 186a and 96a and the second edge portions 186b and 96b of the first and second edge patterns 186 and 96 to be larger than the angles of the first and second embodiments. That is, the transmittance is increased by 9~11% compared to the transmittance in the lower edge portions of the pixel regions in the first and second embodiments. Accordingly, it is possible to sharply reduce an inefficient driving region and a disclination region in the lower edge portions.

<Fourth Embodiment>

Figure 15:
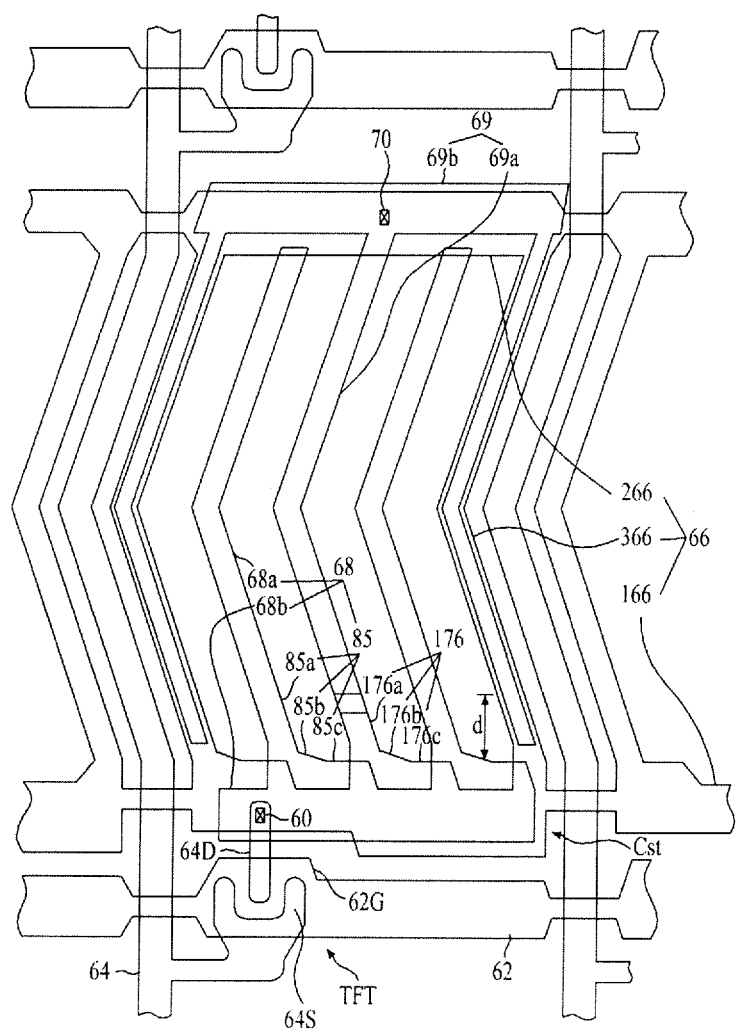
FIG. 15 illustrates a plan view of a thin film transistor substrate of an in-plane switching mode according to a fourth embodiment of the present invention.
Figure 16:
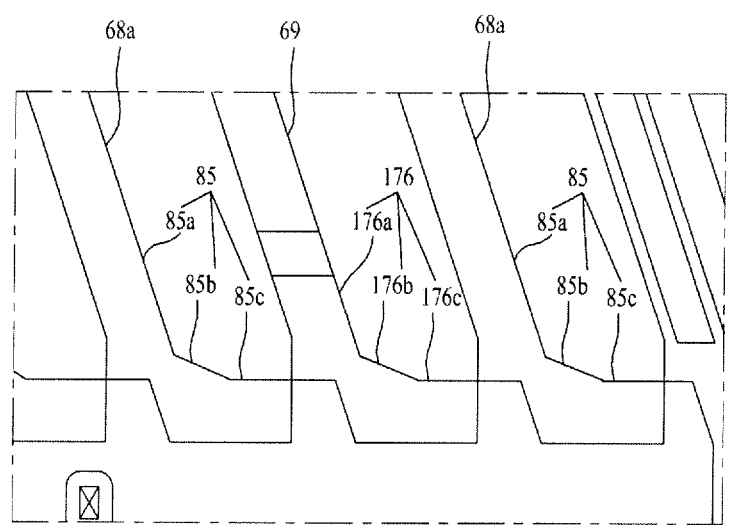
FIG. 16 illustrates an enlarged view of lower edge portions in pixel regions of FIG. 15.

FIG. 15 illustrates a plan view of a thin film transistor substrate of an in-plane switching mode according to a fourth embodiment of the present invention, and FIG. 16 illustrates an enlarged view of lower edge portions in pixel regions of FIG. 15. The sectional views of the thin film transistor substrate according to the fourth embodiment of the present invention are the same as the sectional views of the second embodiment. Accordingly, compared to the second embodiment, the description of repeated components is omitted.

Referring to FIGS. 15 and 16, first edge patterns 176 are formed between the first horizontal portions 166 of the common lines 66 and the first fingers 69a. The first edge patterns 176 include first edge portions 176a extended from the first fingers 69a, second edge portions 176b inclined to the first edge portions 176a at an obtuse angle of 135~160 degrees, and third edge portions 176c connected to the second edge portions 176b and formed parallel to the first horizontal portions 166 of the common lines 66.

Second edge patterns 85 are formed between the pixel electrode connecting portions 68b and the second fingers 68a. The second edge patterns 85 include first edge portions 85a extended from the second fingers 68a, second edge portions 85b inclined to the first edge portions 85a at an obtuse angle of 135~160 degrees, and third edge portions 85c connected to the second edge portions 85b and formed parallel to the pixel electrode connecting portions 68b.

As described above, an electric field having a direction similar to the horizontal electric field formed between the first fingers 69a and the second fingers 68a is also between the first and second edge patterns 176 and 85 by forming the angles between the first edge portions 176a and 85a and the second edge portions 176b and 85b of the first and second edge patterns 176 and 85 to be larger than the angles of the first to third embodiments. That is, the transmittance is increased by 11~13% compared to the transmittance in the lower edge portions of the pixel regions in the first and second embodiments. Accordingly, it is possible to sharply reduce an inefficient driving region and a disclination region in the lower edge portions.

<Modified Example of First to Fourth Embodiments>

As described above, one ends of the first fingers and the second fingers include at least one L-shaped protruded pattern. The other ends thereof may be formed symmetrically to the one ends. Further, as in the second to fourth embodiments (see FIGS. 6, 13 and 15), the other ends of the first fingers and the second fingers may be formed in a bar shape without being separated from the second horizontal portions 266 of the common lines.

Referring to FIG. 6, the common electrode fingers 69a and the second fingers 68a are formed parallel to each other. The other ends of the respective fingers 69a and 68a have a bar shape extending a traveling direction of the 69a and 68a, and are formed without being separated from the second horizontal portions 266.

Further, the other ends of the second fingers 68a are formed in a |-shape without being separated from the second horizontal portions 266. The first fingers 69a are connected to the common electrode connecting portions 69b on the second horizontal portions 266, and the first fingers 69a and the common electrode connecting portions 69b are formed as a single body. In this case, the other ends of the second fingers 68a are formed not to be separated from the second horizontal portions 266. According to circumstances, the other ends of the second fingers 68a may be formed in contact with the boundaries of the second horizontal portions 266 without overlapping.

As described above, the second fingers 68a are formed without separation from the second horizontal portions 266 functioning as common lines in order that pixel voltages and common voltages electrically form the uniform direction of electric field without spatial omission to minimize disclination.

In this case, the first fingers 69a are formed as a single body with the common electrode connecting portions 69b formed of transparent metal on the same layer. The common electrode connecting portions 69b overlap with the second horizontal portions 266 and are separated from the second fingers 68a. Accordingly, the common electrode connecting portions 69b are formed inwardly from the boundaries of the second horizontal portions 266 meeting the second fingers 68a. In this case, the first fingers 69a are formed as a single body with the common electrode connecting portions 69b on the second horizontal portions 266. From a plan view, the first fingers 69a are seen to overlap with the second horizontal portions 266.

Meanwhile, although the above modified example is described with reference to the drawings used in the second to fourth embodiments, the modified example may be applied to the first embodiment by changing the shapes of the second fingers and the first fingers corresponding to the upper common lines of the pixel regions, thereby obtaining the same effect.

<Fifth Embodiment>

Figure 17:
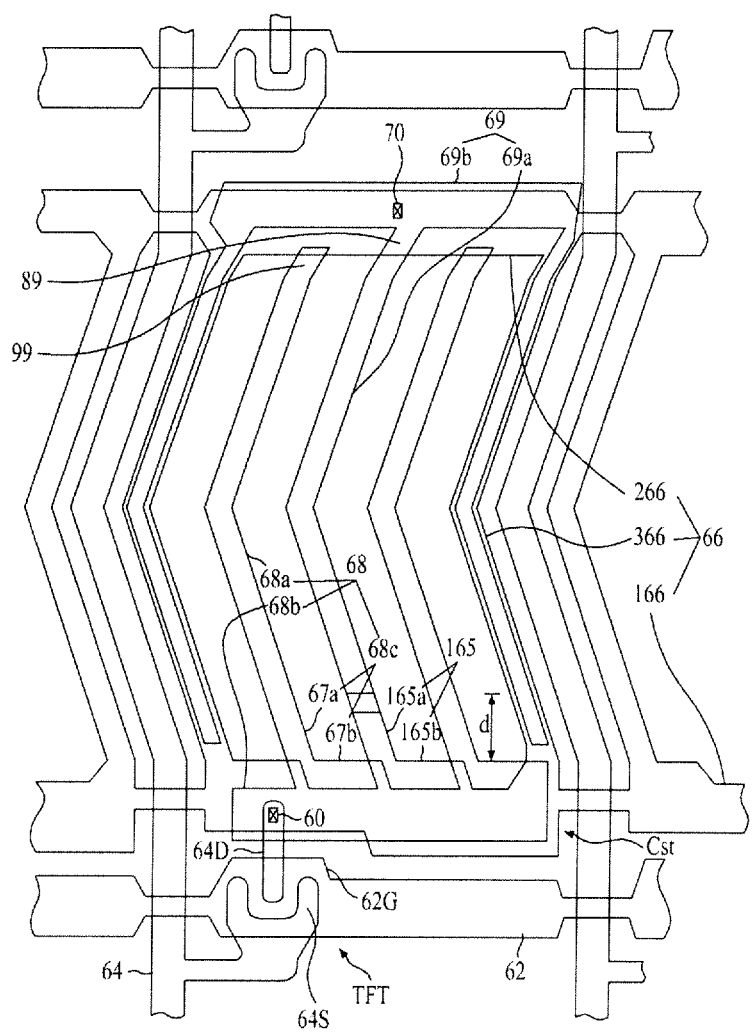
FIG. 17 illustrates a plan view of a thin film transistor substrate of an in-plane switching mode according to a fifth embodiment of the present invention.
Figure 18:
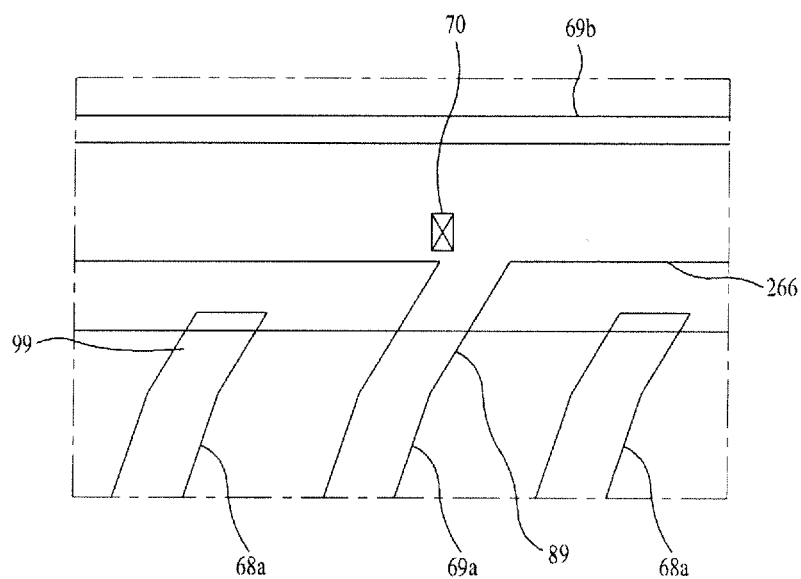
FIG. 18 illustrates an enlarged view of upper edge portions in pixel regions of FIG. 17.

FIG. 17 illustrates a plan view of a thin film transistor substrate of an in-plane switching mode according to a fifth embodiment of the present invention, and FIG. 18 illustrates an enlarged view of upper edge portions in pixel regions of FIG. 17. The sectional views of the thin film transistor substrate according to the fifth embodiment of the present invention are the same as the sectional views of the second embodiment. Accordingly, compared to the second embodiment, the description of repeated components is omitted.

Referring to FIGS. 17 and 18, third edge patterns 89 are formed between the common electrode connecting portions 69b and the first fingers 69a in the upper edge portions of the pixel regions. The third edge patterns 89 are formed to be inclined in a direction different from the traveling direction of the common electrode connecting portions 69b. In this case, the direction of the third edge patterns 89 is inclined toward the traveling direction of the common electrode connecting portions 69b at an angle of 23~26 degrees.

Further, fourth edge patterns 99 are formed to be extended from the second fingers 68a and overlap with the second horizontal portions 266 of the common lines 66. In this case, the length of the fourth edge patterns 99 except overlapping portions with the second horizontal portions 266 of the common lines 66 is 8~10 μm. The fourth edge patterns 99 are formed to be inclined toward the second fingers 68a at an angle of 20~30 degrees, preferably, 23~26 degrees.

The third and fourth edge patterns 89 and 99 are alternately formed parallel to each other. An electric field having a direction similar to the electric field formed between the first fingers 69a and the second fingers 68a is also between the third and fourth edge patterns 89 and 99.

As described above, the third edge patterns 89 extended from the first fingers 69a in the upper edge portions of the pixel regions and the fourth edge patterns 99 extended from the second fingers 68a are formed to be inclined toward the first fingers 69a and the second fingers 68a at an angle of 23~26 degrees. Accordingly, the transmittance is increased by 48~50% compared to the transmittance in the upper edge portions of the conventional pixel regions.

In this case, the first and second edge patterns 165 and 68c may be formed as any structure of the first and second edge patterns in the first to fourth embodiments. In a structure having the third and fourth edge patterns and the first and second edge patterns of the fourth embodiment, the transmittance is increased by 12.6% compared to a structure having the first and second edge patterns of the first and second embodiments.

As described above, in the thin film transistor substrate of an in-plane switching mode according to the embodiments of the present invention, the L-shaped edge patterns extended from the fingers are alternately formed in the lower edge portions of the pixel regions, and the edge patterns extended from the fingers and having an inclination are alternately formed in the upper edge portions of the pixel regions. Accordingly, it is possible to improve uniformity of the direction of electric field and to sharply reduce an inefficient driving region and a disclination region. Thus, the thin film transistor substrate of an in-plane switching mode according to the embodiments of the present invention can improve the transmittance and the contrast ratio of the liquid crystal display device of a horizontal electric field application type.

The fifth embodiment can be achieved by inclining the other ends of the first fingers and the second fingers in the modified example of the first to fourth embodiments. The fifth embodiment can be applied at the same time with the structures described in the first to fourth embodiments. That is, the structure of the fifth embodiment is applied to the upper sides of the pixel regions and the structure of the first to fourth embodiments or the modified example is applied to the lower sides thereof, thereby obtaining the same effect.

Hereinafter, a method for manufacturing a thin film transistor substrate according to the second embodiment of the present invention will be described with reference to FIG. 19A to 20C.

Figure 19A:
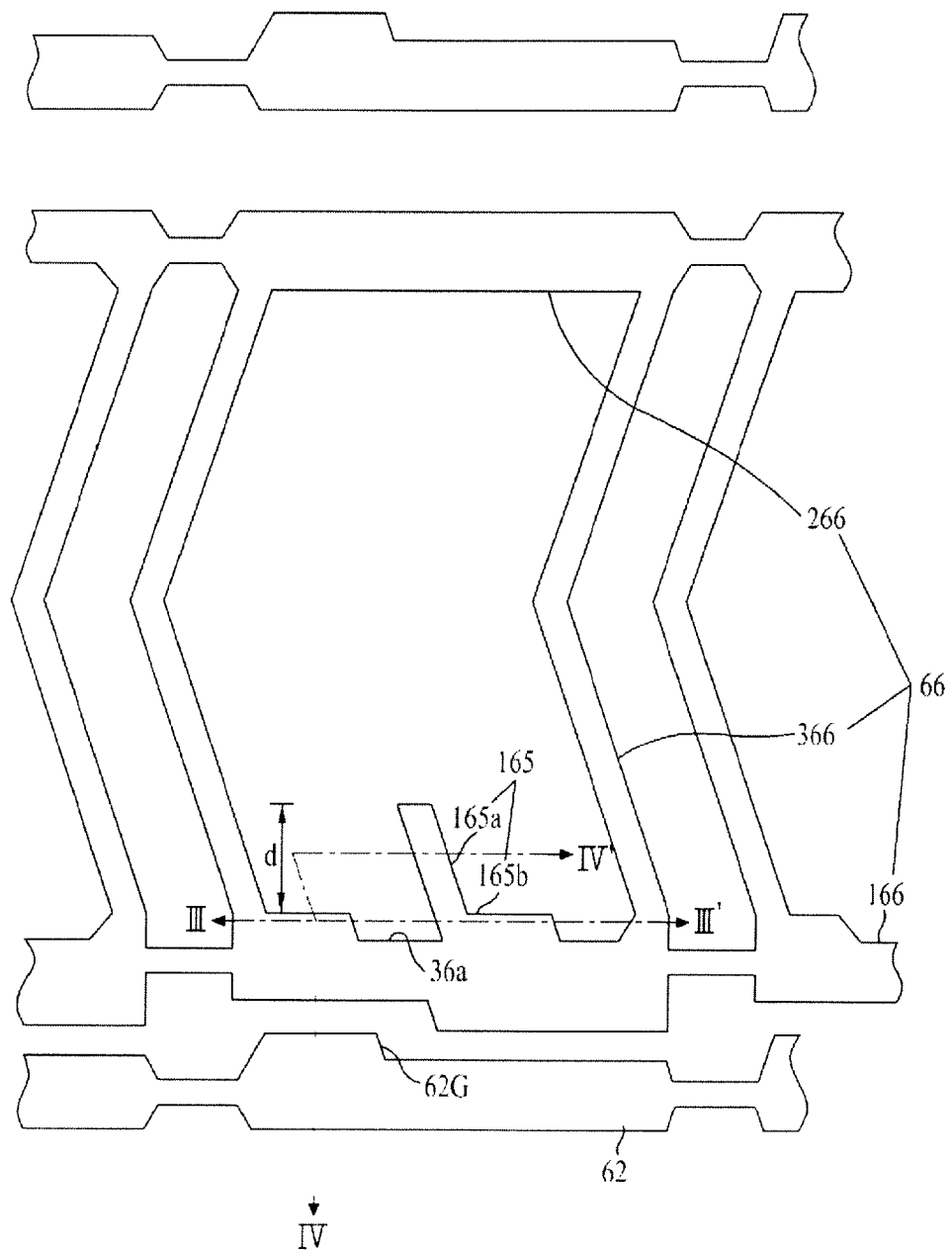
FIGS. 19A to 20C illustrate diagrams for explaining a method for manufacturing a thin film transistor substrate according to the second embodiment of the present invention.
Figure 20A:
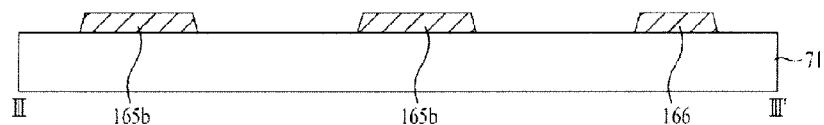

Referring to FIGS. 19A and 20A, a first conductive pattern including the gate lines 62, the gate electrode 62G, the common lines 66 having the first horizontal portions 166 and the second horizontal portions 266 respectively formed at the lower and upper sides of the pixel regions in a horizontal direction, the shield patterns 366 connecting the first and second horizontal portions 166 and 266, and the first edge patterns 165 protruded from the first horizontal portions 166 toward the pixel regions in central portions of the pixel regions.

The first conductive pattern is formed by forming a gate metal layer on the substrate 71 and, then, patterning the gate metal layer through the first mask process including a photolithography process and an etching process. The gate metal layer is formed as a single layer or multiple layers using metal such as molybdenum (Mo), aluminum (Al), aluminum-neodymium (Al—Nd), copper (Cu), chromium (Cr) and titanium (Ti), and an alloy thereof.

Figure 19B:
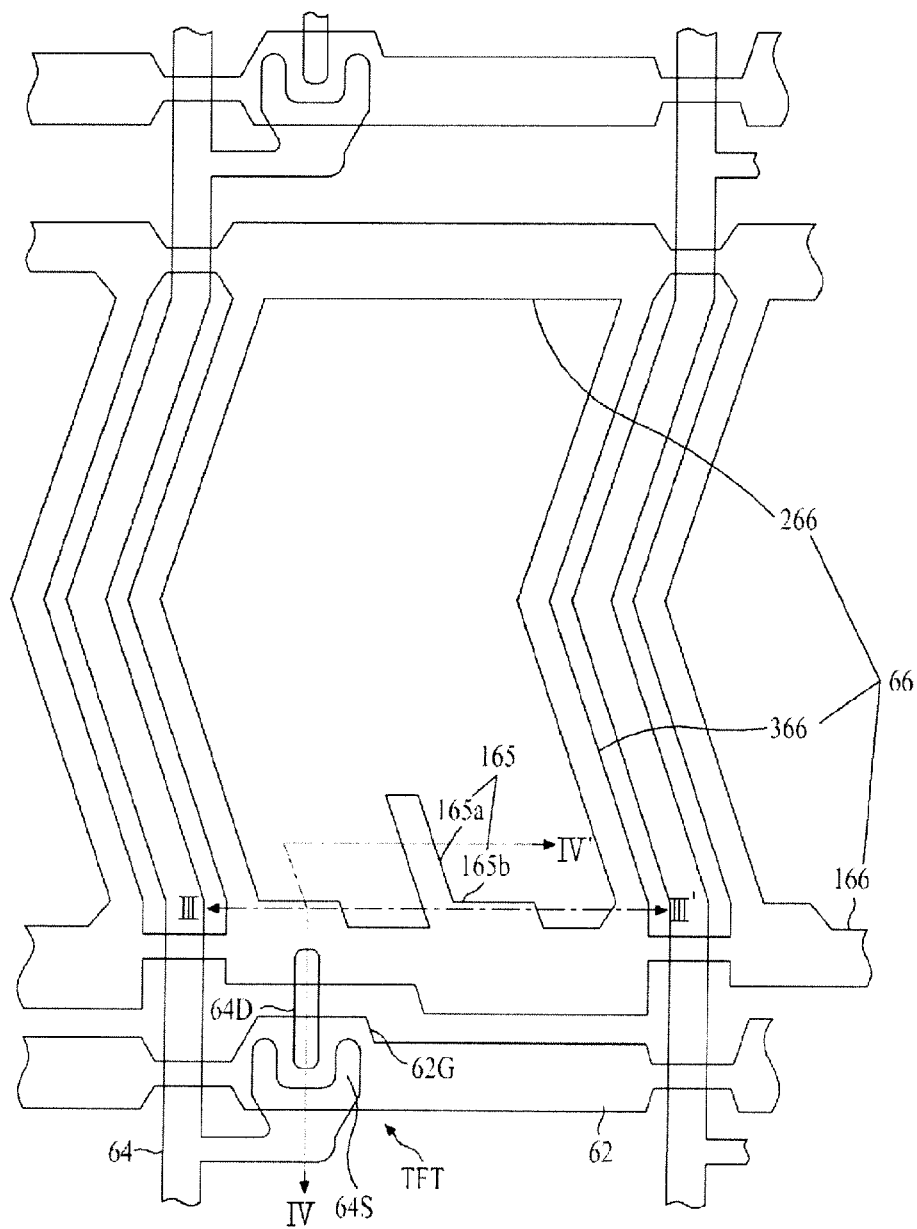
Figure 20B:
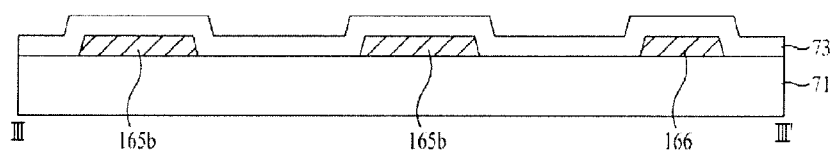
Figure 20B:
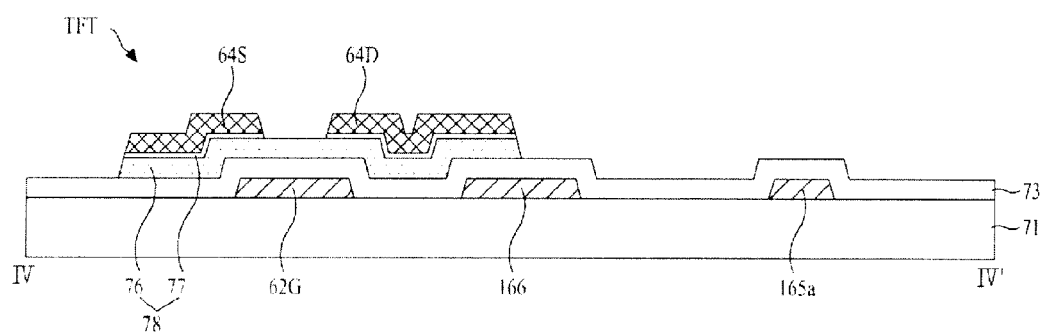

Referring to FIGS. 19B and 20B, the gate insulating film 73 is formed on the substrate 71 to cover the first conductive pattern. Then, the semiconductor patterns 78 and a second conductive pattern including the data lines 64, the source electrodes 64S and the drain electrodes 64D are formed on the gate insulating film 73 through a second mask process.

The gate insulating film 73 is made of an inorganic insulating material such as silicon oxide (SiOx) or silicon nitride (SiNx).

The semiconductor patterns 78 and a second conductive pattern according to the second embodiment of the present invention are formed by the same method as the method described in FIGS. 10A and 10B. The second conductive pattern according to the second embodiment of the present invention is the same as the second conductive pattern described in FIGS. 10A and 10B.

Figure 19C:
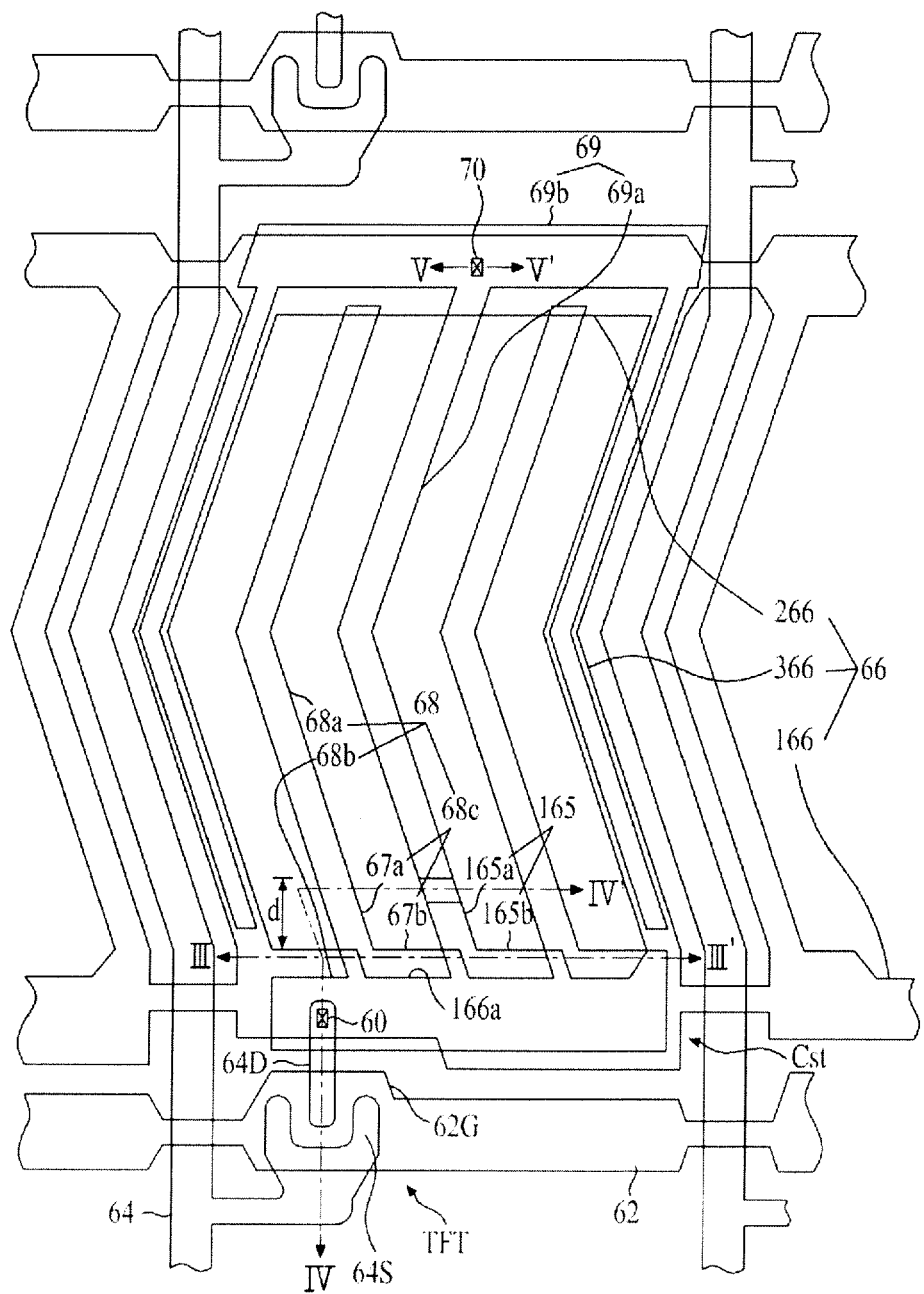
Figure 20C:
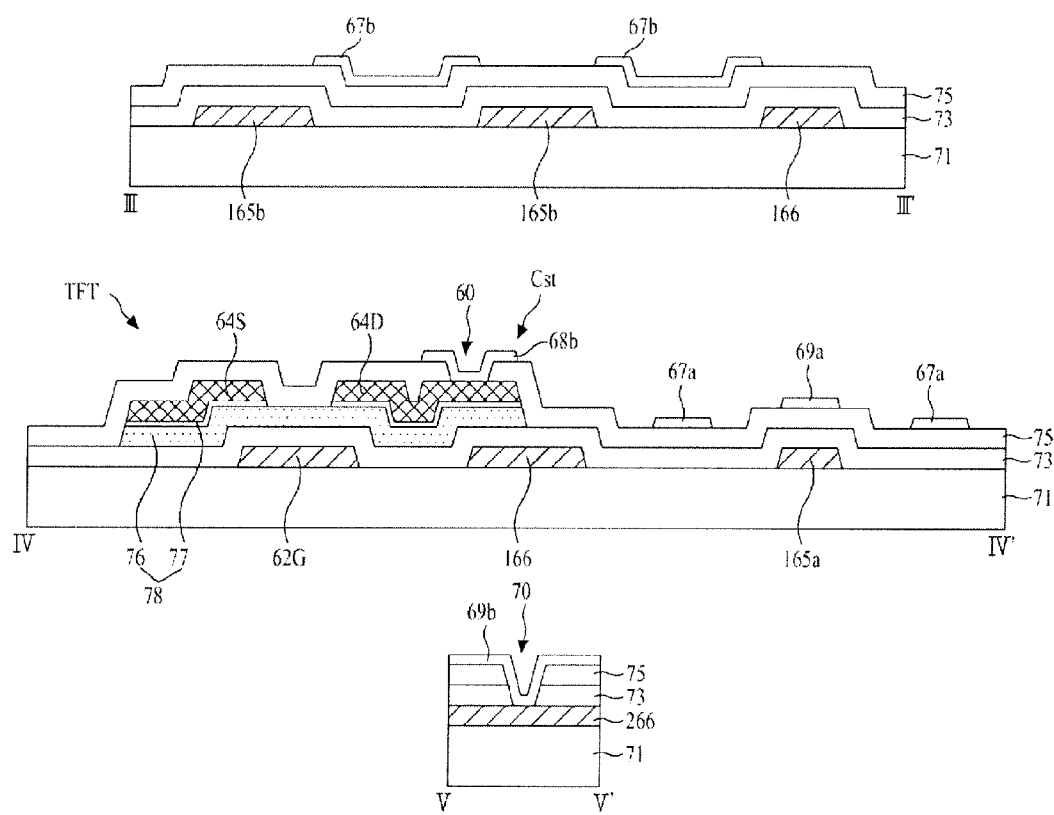

Referring to FIGS. 19C and 20C, the passivation film 75 is formed on the gate insulating film 73 to cover the semiconductor patterns 78 and the second conductive pattern. Then, are formed by etching at least one of the passivation film 75 and the gate insulating film 73 using the third mask process including a photolithography process and an etching process.

The passivation film 75 may be formed by depositing an inorganic insulating material such as silicon oxide (SiOx) or silicon nitride (SiNx) via a deposition method such as a plasma enhanced chemical vapor deposition (PECVD) method. Further, the passivation film 75 may be formed by coating an organic insulating material such as an acrylic organic compound having a small dielectric constant, benzo cyclobutene (BCB), Perfluorocyclobutane (PFBC), Teflon and Cytop via a coating method such as a spin coating method or a spinless coating method.

A third conductive pattern according to the second embodiment of the present invention is formed to include the second electrodes 68 and the first electrodes 69. In this case, the third conductive pattern is made of transparent metal such as ITO or IZO. Further, the second electrodes 68 include the pixel electrode connecting portions 68b formed above the first horizontal portions 166, the second fingers 68a parallel to the data lines 64 in the pixel regions, and the second edge patterns 68c formed as L-shaped protruded patterns between the second fingers 68a and the pixel electrode connecting parts 68b. In this case, the second edge patterns 68c are parallel to the first edge patterns 165 and are formed as a single body with the second fingers 68a and the pixel electrode connecting portions 68b. Further, the first electrodes 69 are formed to include the first fingers 69a parallel to the second fingers 68a, and the common electrode connecting portions 69b formed above the second horizontal portions 266.

The pixel contact holes 60, the first edge portions 67a, the pixel electrode connecting portions 68b, and the first fingers 69a are formed on the passivation film 75 through the third mask process including a photolithography process and an etching process.

The common features of the embodiments of the present invention are explained.

The thin film transistor substrate of the liquid crystal display device of an in-plane switching mode according to the present invention includes gate lines and data lines crossing each other to define pixel regions, thin film transistors formed at crossing portions of the gate lines and the data lines, common lines formed on the same layer as the gate lines, first electrode fingers having a plurality of diverged first fingers in the pixel regions and L-shaped protruded patterns formed at one ends of the first fingers, and second electrode fingers having second fingers formed alternately with the first fingers in the pixel regions and l-shaped patterns formed at one ends of the second fingers. The L-shaped protruded patterns and the l-shaped patterns substantially overlap partly with the first common lines. In this case, the first electrode fingers and the second electrode fingers may be defined as common electrodes and second electrodes, respectively, and vice versa.

In this case, the L-shaped protruded patterns and the l-shaped patterns may be formed to be extended toward the first common lines.

Further, in a case where the l-shaped patterns have a bar shape, the first common lines may be extended toward the pixel regions without separation from the L-shaped protruded patterns or the l-shaped patterns, or to overlap therewith.

Further, the second electrode fingers also have the same shape as the first electrode fingers. The bar patterns of one ends of the second electrode fingers are extended toward the first common lines to overlap with the L-shaped protruded patterns of the left side, and are extended in a "-" shape to overlap with the L-shaped protruded patterns of the right side. In this case, one ends of both the first electrode fingers and the second fingers have L-shaped protruded patterns.

Particularly, in a case where the first electrode fingers are formed as a single body with the first common lines on the same, layer, one ends of the second electrode fingers preferably include the L-shaped protruded patterns.

Further, the first common lines include reduction portions having a reduced width, corresponding to the "-" shaped pattern portions of the second electrode fingers. The reduction portions and the horizontal portions of the L-shaped protruded patterns, adjacent to the reduction portions on the left and right sides, have a stepped shape on a plan view.

Meanwhile, the first electrode fingers and the second electrode fingers may be formed in a direction rotated by about 90 degrees from a direction parallel to the data lines, as shown in the plan view. In this case, the first common lines are formed parallel to the gate lines, and the first electrode fingers and the second electrode fingers rotated by about 90 degrees have a shape inclined to the gate lines, thereby minimizing an inactive region.

Further, in the thin film transistor substrate of the in-plane switching mode liquid crystal display device, second common lines passing through the pixel regions may be formed parallel to the first common lines at symmetric positions of the same layer.

In this case, as in the first embodiment, the other ends of the first fingers and the second fingers may be formed to include the L-shaped protruded patterns symmetrically to the one ends of the first fingers and the second fingers overlap partly with the second common lines. According to circumstances, the other ends may have a bar shape, and the first fingers and the second fingers may be formed without separation from the second common lines.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device of an in-plane switching mode comprising:
   a substrate;
   gate lines and data lines which cross each other on the substrate to define pixel regions;
   thin film transistors which are formed at crossing portions of the gate lines and the data lines;
   first electrodes which have a plurality of first fingers and include L-shaped protruded patterns at one end of each of the first fingers in the pixel regions, wherein the L-shaped protruded patterns include first edge portions extended from the first fingers and second edge portions inclined to the first edge portions at 100~115 degrees, and the second edge portion is parallel to the gate lines, wherein the first fingers are formed as a single body with at least one common line;
   second electrodes which have second fingers formed alternately with the first fingers and include l-shaped patterns at one end of each of the second fingers in the pixel regions, wherein at the one end of each of the second fingers, the l-shaped pattern is extended toward the at least one common line to overlap with adjacent L-shaped protruded patterns of a left side, and "–" shaped patterns are further extended from ends of the l-shaped patterns to overlap with the L-shaped protruded patterns of a right side, wherein the l-shaped patterns and the "–" shaped patterns are formed in a same identical shape with the L-shaped protruded patterns of the first fingers to improve uniformity of a direction of electric field; and
   wherein the at least one common line is formed on a same layer as the gate lines,
   wherein the first electrodes are made of metal of the same layer as the gate lines, and the second electrodes are formed of a transparent metal layer;
   wherein the L-shaped protruded patterns have a shape protruded from the at least one common line the L-shaped protruded patterns made of the metal are separated each other, and each second edge portion overlaps with a part of an adjacent l-shaped pattern made of the transparent metal layer;
   wherein the at least one common line has a reduction portion to open the transparent l-shaped patterns at each end of each of the second fingers;
   wherein the reduction portion and the second edge portion are alternately formed with respect to the at least one common line;
   wherein a crossing portion of each reduction portion and each of the corresponding second edge portion is at each of the corresponding l-shaped pattern, and
   wherein the "–" shaped patterns of the second fingers and the second edge portion of the first fingers are identical portions that are disposed on a same line parallel to the gate line.

2. The liquid crystal display device according to claim 1, wherein the first electrodes and the second electrodes are formed of a transparent metal layer of the same layer.

3. The liquid crystal display device according to claim 1, wherein the at least one common line further includes first protruded patterns overlapping with the l-shaped patterns at horizontal portions of the at least one common line without separation from the l-shaped patterns at one ends of the second fingers.

4. The liquid crystal display device according to claim 1, wherein the first protruded patterns and the horizontal portions of the at least one common line are formed in the same shape as the L-shaped protruded patterns at one ends of the first fingers, and the first protruded patterns partially overlap with l-shaped patterns at one ends of the second fingers.

5. The liquid crystal display device according to claim 1, wherein the at least one common line includes first common lines and second common lines, the second common lines passing through the pixel regions are further formed parallel to the first common lines at symmetric positions of the same layer, and one end of each of the first fingers and one end each of the second fingers are formed symmetrically to the other end of each of the first fingers and the other end of each of the second fingers, respectively and wherein the other end of each of the second fingers overlaps with the second common lines.

6. The liquid crystal display device according to claim 1, wherein the at least one common line include first common lines and second common lines, the second common lines passing through the pixel regions are further formed parallel to the first common lines at symmetric positions of the same layer, one ends of the first fingers and the second fingers are formed in an I-shape to overlap partly with the second common lines.

7. The liquid crystal display device according to claim 1, wherein one ends of the first fingers and the second fingers of the I-shaped patterns are bent at an angle different from a traveling direction of the first fingers and the second fingers to overlap with the at least one common line.

8. The liquid crystal display device according to claim 1, wherein the at least one common line is formed parallel to the gate lines, and the first electrodes and the second electrodes are rotated by about 90 degrees to have a shape inclined to the gate lines.

9. A method for manufacturing a liquid crystal display device of an in-plane switching mode comprising:

forming, on a substrate, gate lines and common lines in one direction with a first metal layer;

forming data lines crossing the gate lines to define pixel regions by selectively removing a second metal layer and forming thin film transistors at crossing portions of the gate lines and the data lines;

forming first electrodes which have a plurality of first fingers and include L-shaped protruded patterns at one ends of the first fingers by selectively removing the first metal layer, wherein the L-shaped protruded patterns include first edge portions extended from the first fingers and second edge portions inclined to the first edge portions at 100~115 degrees, and the second edge portion is parallel to the gate lines and wherein the first fingers of the first electrodes are formed as a single body with at least one common line, the L-shaped protruded patterns have a shape protruded from the at least one common line; and forming second electrodes which have second fingers formed alternately with the first fingers of the first electrodes and include I-shaped patterns at one ends of the second fingers to overlap with the adjacent L-shaped protruded patterns of the first fingers by selectively removing a transparent conductive metal layer, wherein at the one end of each of the second fingers, the I-shaped pattern is extended toward the first common lines to overlap with adjacent L-shaped protruded patterns of a left side, and "–" shaped patterns are further extended from ends of the I-shaped patterns to overlap with the L-shaped protruded patterns of a right side, wherein the I-shaped patterns and the "–" shaped patterns are formed in a same identical shape with the L-shaped protruded patterns of the first fingers to improve uniformity of a direction of electric field, wherein the L-shaped protruded patterns have a shape protruded from the at least one common line, the L-shaped protruded patterns made of the first metal layer are separated each other, and each second edge portion overlaps with a part of an adjacent I-shaped pattern made of the transparent conductive layer;

wherein each of the common line has a reduction portion to open the transparent I-shaped patterns at each end of each of the second fingers;

wherein the reduction portion and the second edge portion are alternately formed with respect to the at least one common line;

wherein a crossing portion between each reduction portion and each of the corresponding second edge portion is at each of the corresponding I-shaped pattern, and wherein the "–" shaped patterns of the second fingers and the second edge portion of the first fingers are identical portions that are disposed on a same line parallel to the gate lines.

* * * * *